US012690511B2

(12) United States Patent
Johnson et al.

(10) Patent No.: US 12,690,511 B2
(45) Date of Patent: Jul. 28, 2026

(54) FRONT-MOUNTED TANK SYSTEM AND METHOD

(71) Applicant: DEERE & COMPANY, Moline, IL (US)

(72) Inventors: Lee A. Johnson, Polk City, IA (US); Colter W. Kinney, Lohrville, IA (US); Nathan A. Mariman, Davenport, IA (US); Oscar S. Tinney, Kewanee, IL (US)

(73) Assignee: Deere & Company, Moline, IL (US)

( * ) Notice: Subject to any disclaimer, the term of this patent is extended or adjusted under 35 U.S.C. 154(b) by 384 days.

(21) Appl. No.: 18/223,689

(22) Filed: Jul. 19, 2023

(65) Prior Publication Data

US 2024/0065136 A1      Feb. 29, 2024

Related U.S. Application Data

(60) Provisional application No. 63/401,770, filed on Aug. 29, 2022.

(51) Int. Cl.
*A01B 59/06* (2006.01)
*A01C 7/20* (2006.01)
*A01C 23/00* (2006.01)

(52) U.S. Cl.
CPC ............ *A01C 7/201* (2013.01); *A01B 59/064* (2013.01); *A01C 23/008* (2013.01)

(58) Field of Classification Search
CPC ...... A01B 59/064; A01C 7/201; A01C 23/008
See application file for complete search history.

(56) References Cited

U.S. PATENT DOCUMENTS

| | | | | |
|---|---|---|---|---|
| 3,985,249 A | * | 10/1976 | Aker | ..................... E02F 3/3631 |
| | | | | 172/275 |
| 4,125,271 A | | 11/1978 | Wiboltt et al. | |
| 2021/0282308 A1 | * | 9/2021 | Kroeger | ............... A01B 59/062 |

FOREIGN PATENT DOCUMENTS

| | | | | |
|---|---|---|---|---|
| DE | 3540198 A1 | | 5/1987 | |
| DE | 4138483 A1 | * | 6/1992 | ........... A01B 63/108 |
| DE | 19826944 A1 | | 12/1999 | |
| DE | 202010007812 U1 | * | 8/2010 | ........... A01C 15/006 |
| EP | 0251053 B1 | | 8/1991 | |

(Continued)

OTHER PUBLICATIONS

Extended European Search Report and Written Opinion issued in European Patent Application No. 23189546.7, dated Jan. 30, 2024, in 12 pages.

*Primary Examiner* — Matthew R Buck
(74) *Attorney, Agent, or Firm* — Taft Stettinius & Hollister LLP; Stephen F. Rost

(57) ABSTRACT

An agricultural machine includes a tractor having a front end, a rear end, and a front frame coupled to the front end. The agricultural machine includes an implement coupled to the rear end of the tractor. The agricultural machine includes a supply line configured to transfer commodity from a front tank, which is configured to be supported above the ground by the front frame, to a main tank of the agricultural machine. The main tank distributes commodity to row units, which distribute the commodity to the soil, and the supply line transfers additional commodity to the main tank. The front frame is movable relative to the front end of the tractor to cause engagement of the supply line with the front tank.

20 Claims, 15 Drawing Sheets

(56)          References Cited

FOREIGN PATENT DOCUMENTS

EP          0737417  A1  *  10/1996   ............. A01C 7/087
EP          2272316  A2      1/2011
EP          2335467  A1      6/2011

* cited by examiner

FRONT-MOUNTED TANK SYSTEM AND METHOD

RELATED DISCLOSURES

This application claims priority to U.S. Provisional Application Ser. No. 63/401,770, filed Aug. 29, 2022, the disclosure of which is hereby incorporated by reference in its entirety.

FIELD OF THE DISCLOSURE

The present disclosure relates to agricultural machines for distributing commodity, and in particular, to systems and methods for transferring commodity between tanks of agricultural machines.

BACKGROUND OF THE DISCLOSURE

Agricultural machines are used for planting, fertilizing, and or other commodity-distributing processes. In conventional agricultural machines, productivity and in-field efficiency are sacrificed when a commodity-distributing process must cease so that commodity-storing tanks can be refilled or replaced with other commodity-storing tanks. Even where tanks can be replaced or refilled on-the-go, conventional machines often lack an efficient process for replacements and refills.

Moreover, for conventional agricultural machines, issues arise related to soil compaction at the rear of the machines and lack of tractive efficiency at the front of the machines. These issues are exacerbated as the machines and the commodity-storing tanks continue to increase in size.

SUMMARY

In an illustrative embodiment, an agricultural machine for distributing commodity, comprises a tractor having a front end and a rear end; an implement coupled to the rear end of the tractor, the implement including a main tank configured to store commodity and a row unit configured to receive commodity from the main tank for distribution to the soil; a front frame pivotably coupled to the front end of the tractor; a front tank supported above the ground by the front frame; a supply line configured to transfer commodity from the front tank to the main tank as commodity is distributed to the soil. In some embodiments, the supply line includes an outlet coupled to the main tank and an inlet that is fixed relative to the front end of the tractor.

In some embodiments, the front frame is positionable at a first angle and a second angle relative to the tractor frame; when the front frame is positioned at the first angle, the inlet of the supply line is not aligned with an outlet of the front tank; and when the front frame is positioned at the second angle, the inlet of the supply line is aligned with the outlet of the front tank.

In some embodiments, the agricultural machine further comprises a latch coupled to the front frame; and the latch is pivotable relative to the front frame from a first position in which the supply line is not coupled to the front tank to a second position in which the supply line is coupled to the front tank. In some embodiments, the agricultural machine further comprises: a boot positioned at an inlet of the supply line; and a brace fixed relative to the latch. In some embodiments, when the latch is in the first position, the brace contacts the front tank to prevent the front tank from contacting the boot. In some embodiments, when the latch is in the second position, the brace and the boot are in contact with the front tank.

In some embodiments, the agricultural machine further comprises a gate movable between a closed position in which the gate blocks an outlet of the front tank to an open position in which the gate does not block the outlet of the front tank. In some embodiments, the agricultural machine further comprises a gate actuator fixed to the front frame for pivoting movement therewith relative to the front end of the tractor; the gate actuator is configured to move the gate between the closed position and the open position when engaged with the gate. In some embodiments, the agricultural machine further comprises a gate actuator configured to move the gate between the closed position and the open position when engaged with the gate; and the gate actuator is engaged with the gate only when the supply line is coupled to the front tank.

In some embodiments, the front frame includes: an intermediate frame pivotably coupled to the tractor frame; and a fork lift frame slidably coupled to the intermediate frame and configured to adjust the height of the front tank while the intermediate frame remains fixed relative to the tractor frame.

In some embodiments, the agricultural machine further comprises a vacuum device coupled to the supply line and configured to urge commodity from the front tank to the main tank. In some embodiments, the agricultural machine further comprises a sensor configured to measure at least one of: the volume of commodity in the main tank, the mass of commodity in the main tank, and the flow rate of commodity from the main tank; and a controller operatively coupled to the sensor and configured to control the transfer of commodity from the front tank to the main tank based on measurements from the sensor.

In some embodiments, the commodity that the supply line is configured to transfer from the front tank to the main tank is a first commodity; and the agricultural machine further comprises a secondary supply line that is coupled to front tank and configured to transfer a second commodity that is different than the first commodity.

In another illustrative embodiment, agricultural machine for distributing commodity comprises: a tractor having a front end, a rear end, and a tractor frame disposed at the front end; an implement coupled to the rear end of the tractor and configured to distribute commodity to the soil, the implement including a main frame and a main tank that is supported by the main frame and configured to store commodity; an intermediate frame pivotably coupled to the tractor frame; a fork lift frame slidably coupled to the intermediate frame such that a height of the fork lift frame is adjustable relative to the tractor frame while the intermediate frame remains fixed relative to the tractor frame; a supply line coupled to the tractor frame and configured to transfer commodity to the main tank as commodity is distributed to the soil by the implement.

In some embodiments, the supply line includes an inlet configured to receive commodity from a front tank that the fork lift frame is configured to support; and the inlet of the supply line is fixed relative to the tractor frame. In some embodiments, the supply line is coupleable to a front tank that the fork lift frame is configured to support; and the front tank includes a gate movable between an open position that allows flow of commodity from the front tank to the supply line and a closed position that prevents passage of commodity from the front tank to the supply line.

In some embodiments, the supply line is coupleable to a front tank that the fork lift frame is configured to support; the agricultural machine further comprises a latch pivotally coupled to the fork lift frame; and the latch is configured to pivot relative to the front frame from a first position in which the supply line is not coupled to the front tank to a second position in which the supply line is coupled to the front tank. In some embodiments, the latch rotates into a void formed by at least one side wall of the front tank as the latch pivots relative to the fork lift frame from the first position to the second position. In some embodiments, the latch includes an opening; and a catch of the front tank that is positioned in the void moves through the opening of the latch as the latch pivots relative to the fork lift frame from the first position to the second position.

In another illustrative embodiment, a method for distributing commodity comprises: pivoting an intermediate frame relative to the front end of a tractor to which the intermediate frame is coupled; adjusting the height of a front tank supported by a fork lift frame, which includes sliding the fork lift frame relative to the intermediate frame to which the fork lift frame is coupled; pivoting a latch relative to the fork lift frame to couple a supply line, which is fixed relative to the tractor, to an outlet of the front tank; and transferring commodity via the supply line from the front tank to a main tank positioned rearward of the tractor subsequent to the pivoting steps.

In another illustrative embodiment, an agricultural machine for distributing commodity to soil, comprises: a tractor having a front end, a rear end, and a front frame movably coupled to the front end; a main tank configured to store commodity; an implement coupled to the rear end of the tractor, the implement including row units configured to distribute commodity received from the main tank to the soil; a front tank configured to be supported above the ground by the front frame; and a supply line configured to transfer additional commodity from the front tank to the main tank as commodity from the main tank is distributed to the soil via the row units. In some embodiments, the supply line includes an outlet coupled to the main tank and an inlet that is fixed to the front frame for movement therewith relative to the front end of the tractor.

In some embodiments, the agricultural machine further comprises: a first actuation assembly including a first actuator configured to extend and retract to move the front frame relative to the front end of the tractor; and a second actuation assembly separate from the first actuation assembly and including a second actuator configured to extend and retract to move the front frame relative to the front end of the tractor.

In some embodiments, the actuator of the first actuation assembly is configured to extend to move the front frame downward relative to the front end of the tractor and configured to retract to move the front frame upward relative to the front end of the tractor. In some embodiments, the actuator of the second actuation assembly is configured to extend move an upper portion of the front frame away from the front end of the tractor and configured to retract to move the upper portion of the front frame toward the front end of the tractor.

In some embodiments, the front frame includes an upper portion and a lower portion; the first actuation assembly is pivotably coupled to the front end of the tractor and pivotably coupled to the lower portion of front frame. In some embodiments, the second actuation assembly is pivotably coupled to the front end of the tractor and pivotably coupled to the upper portion of the front frame. In some embodiments, the first actuation assembly includes a base that is pivotably coupled to the front end of the tractor; and the actuator of the first actuation assembly is pivotably coupled to the base and to the front end of the tractor.

In some embodiments, the agricultural machine further comprises: a gate movable relative to an outlet of the front tank between a closed position in which the gate blocks the outlet of the front tank and an open position in which the gate does not block the outlet of the front tank. In some embodiments, the agricultural machine further comprises: a gate actuator fixed to the front frame for movement therewith relative to the front end of the tractor; and the gate actuator is configured to move the gate from the closed position to the open position when engaged with the gate.

In some embodiments, the agricultural machine further comprises: a spring including a first end coupled to the gate for movement therewith and a second end fixed relative to the outlet of the front tank; and the spring is biased to maintain the gate in the closed position.

In some embodiments, the agricultural machine further comprises: an airflow device coupled to the supply line and configured provide airflow to urge commodity from the front tank to the main tank. In some embodiments, the agricultural machine further comprises: a sensor configured to measure at least one of: a volume of commodity in the main tank, a mass of commodity in the main tank, and a flow rate of commodity from the main tank; and a controller operatively coupled to the sensor and configured to control the transfer of commodity from the front tank to the main tank based on at least one measurement from the sensor.

In some embodiments, the front frame includes an upper portion and a lower portion; one of the upper portion and the front tank includes a hook, and the other of the upper portion and the front tank includes a bracket configured to receive the hook; and, when the hook is engaged with the bracket, the hook is configured to rotate relative to the bracket to engage the supply line with the front tank.

In some embodiments, the front frame includes an upper portion and a lower portion; the upper portion includes a first pair of brackets and the lower portion includes a second pair of brackets; and each bracket of the first pair of brackets and each bracket of the second pair of brackets is v-shaped such that each bracket includes a pair of outer edges that converge to a middle portion of the bracket.

In another illustrative embodiment, an agricultural machine for distributing commodity to soil, comprises: a tractor having a front end, a rear end, and a front frame movably coupled to the front end; a main tank configured to store commodity; an implement coupled to the rear end of the tractor, the implement including row units configured to distribute commodity received from the main tank to the soil; and a supply line configured to transfer additional commodity to the main tank as commodity from the main tank is distributed to the soil via the row units; the supply line includes an outlet coupled to the main tank and an inlet that is fixed to the front frame for movement therewith relative to the front end of the tractor.

In some embodiments, the agricultural machine further comprises: a first actuation assembly including a first actuator configured to extend and retract to move the front frame relative to the front end of the tractor; and a second actuation assembly separate from the first actuation assembly and including a second actuator configured to extend and retract to move the front frame relative to the front end of the tractor. In some embodiments, the front frame includes an upper portion and a lower portion; the first actuation assembly is pivotably coupled to the front end of the tractor and bly is pivotably coupled to the front end of the tractor and pivotably coupled to the lower portion of front frame; and the second actuation assembly is pivotably coupled to the front end of the tractor and pivotably coupled to the upper portion of the front frame.

In another illustrative embodiment, a method for distributing commodity comprises: engaging a front frame of a tractor with a front tank that has commodity therein; pivoting the front frame relative to a front end of the tractor to engage a supply line, which is fixed to the front frame, with the front tank; and transferring commodity from the front tank to a main tank via the supply line after the supply line is engaged with the front tank.

In some embodiments, pivoting the front frame relative to the front end of the tractor includes: adjusting a first actuator included in a first actuation assembly that is coupled to a lower portion of the front frame; and adjusting a second actuator included in a second actuation assembly that is coupled to an upper portion of the front frame.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 6 shows the gate of the front tank in a closed position;

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description.

Rather, the embodiments are chosen and described so that others skilled in the art may appreciate and understand the principles and practices of the present disclosure.

Figure 1:
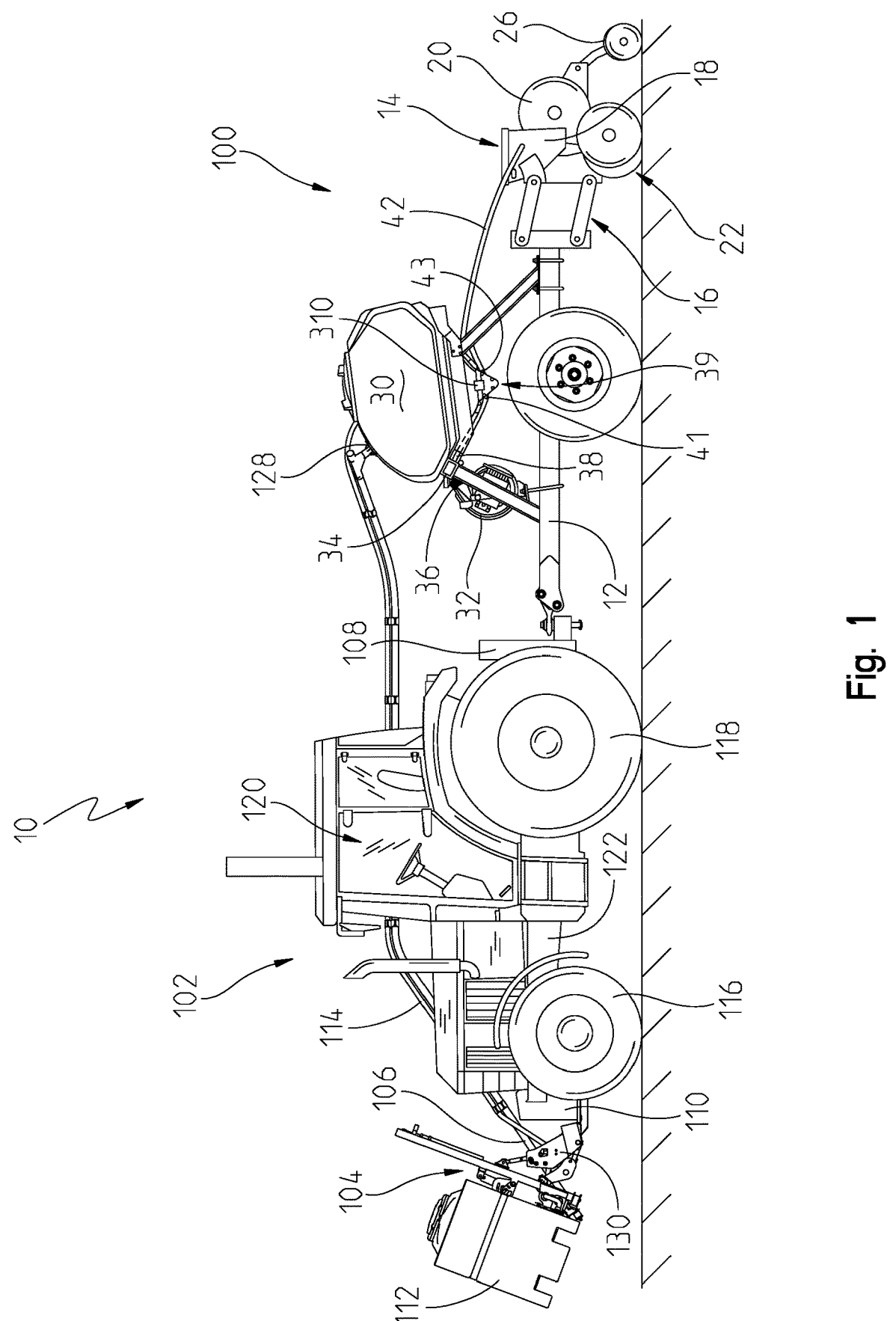
FIG. 1 is a side view of an agricultural machine having a tractor, an implement with a main tank, supply lines, and a front frame supporting a front tank.

Referring to FIG. 1 of the present disclosure, an embodiment of an agricultural machine 10 for planting, fertilizing, and/or otherwise distributing commodity is shown. The agricultural machine 10 includes an implement 100, a tractor 102, a front frame 104, and a supply line 106. The tractor 102 includes front and rear ground engaging mechanisms 116, 118, which may be embodied as wheels, as shown in FIG. 1, or tracks. The tractor 102 includes a cab 120 that may house operator controls such as a user interface, and a chassis 122 that may support a prime mover configured to facilitate movement of the agricultural machine 10 during a planting, fertilizing, and/or other commodity-distributing operation.

As shown in FIG. 1, the implement 100 is coupled to a rear end 108 of the tractor 102, and the front frame 104 is coupled to a front end 110 of the tractor 102. In some embodiments, a front commodity-storing tank or front tank 112 is included in the agricultural machine 10. In other embodiments, the front tank 112 is considered a separate component from the agricultural machine 10. In any event, the front frame 104 is configured to support the front tank 112 above the ground and adjust the height and angle at which the front tank 112 is disposed. Ultimately, movement of the front frame 104 facilitates alignment between an outlet 124 of the front tank 112 an inlet 126 of the supply line 106. As shown in FIG. 1, when the supply line 106 is coupled to the front tank 112, a portion of the cab 120 is above the front tank 112 and the front frame 104 such that the front tank 112 and the front frame 104 do not block a line of sight from the cab 120 to the ground to be traversed by the agricultural machine 10.

When the supply line 106 is coupled to the front tank 112, the supply line 106 may transfer commodity to a main tank 30, which is included on the implement 100. As suggested by FIG. 1, the supply line 106 includes an outlet 128 coupled to the main tank 30. In some embodiments, the main tank 30 may distribute commodity to row units 14, which distribute the commodity to the soil. In some embodiments, transfer of commodity to the main tank 30 via the supply line 106 occurs simultaneously with distribution of commodity from the main tank 30. As a result, commodity may be stored in the front tank 112 until needed for distribution from the main tank 30. Storing commodity in the front tank 112 allows for an unprecedented distribution of weight toward a front end of the agricultural machine 10, which reduces unwanted soil compaction and increases tractive efficiency.

Referring still to FIG. 1, in the illustrative embodiment, the implement 100 includes a main frame 12 to which one or more row units 14 are mounted. In FIG. 1, only a single row unit 14 is shown, but it is to be understood that a plurality of row units 14 may be coupled to the main frame 12 in a known manner. The row units 14 may be coupled to the main frame 12 by a parallelogram linkage 16 so that the row units 14 can move up and down to a limited degree relative to the main frame 12.

Each row unit 14 may include an auxiliary or secondary hopper 18 for holding commodity such as fertilizer, seed, chemical, or any other known commodity. In this embodiment, the secondary hopper 18 may hold seed. As such, a seed meter 20 is shown for metering seed received from the secondary seed hopper 18. A furrow opener 22 may be provided on the row unit 14 for forming a furrow in a field for receiving metered seed (or other commodity) from the seed meter 20. The seed or other commodity may be transferred to the furrow from the seed meter 20 by a seed tube. A closing assembly 26 may be coupled to each row unit 14 and is used to close the furrow with the seed or other commodity contained therein.

In one embodiment, the seed meter 20 is a vacuum seed meter, although in alternative embodiments other types of seed meters using mechanical assemblies or positive air pressure may also be used for metering seed or other commodity. The present disclosure is not solely limited to dispensing seed. Rather, the principles and teachings of the present disclosure may also be used to apply a non-seed commodity to the field. For example, a fertilizer, pesticide, or other commodity may be directed to the secondary hopper 18, metered by the commodity meter 20, applied to the field by the applicator. In some embodiments, as suggested by FIG. 1, the agricultural machine may include the supply line 106, which is configured to transfer a first commodity from the front tank 112 to the main tank 30, and a secondary supply line 114 which is configured to transfer a second, different commodity from the front tank 112. For example, the secondary supply line 114 may transfer fertilizer to a fertilizer tank on the implement 100.

Referring still to FIG. 1, the main frame 12 of the implement 100 may support main tank 30 and a blower or fan 32. The blower or fan 32 may be operably driven by a hydraulic motor. In another embodiment, however, other motor arrangements such as an electric motor and the like may be used. The blower or fan 32 can direct pressurized air to a manifold 34 through a main air hose or line 36. The manifold 34 may be formed from a hollow closed tubular support of the main frame 12 and is provided with a plurality of manifold outlets corresponding to the number of row units 14 mounted to the main frame 12. In this embodiment, individual air supply lines 38 may extend from the manifold outlets and direct pressurized air from the manifold 34 to an upstream side of a nozzle assembly 39. The nozzle assembly 39 may be located at a lower or bottom portion of the main tank 30 as shown.

As commodity such as fertilizer or seed is deposited into the main tank 30, the commodity flows by gravity to the nozzle assembly 39. The upstream side of the nozzle assembly 39 is provided with a number of air inlets 41 corresponding to the number of air supply hoses 38. The air inlets 41 may be spaced transversely along the upstream side of the nozzle assembly 39. The downstream side of the nozzle assembly 39 may be provided with a number of commodity outlets 43 corresponding to the number of air supply hoses 38. The commodity outlets 43 may also be spaced transversely along the downstream side of the nozzle assembly 39. The commodity outlets 43 lie opposite from the air inlets 41. Each air inlet 41 is aligned with a respective commodity outlet 43. As shown in FIG. 1, distribution or commodity supply hoses 42 may be coupled to and extend from the commodity outlets 43 to the individual secondary hoppers 18 for directing commodity entrained in the air stream to the secondary hoppers 18. It should be appreciated that in other embodiments, commodity may be distributed from the main tank 30 in other ways known in the art, and this disclosure is not limited to any particular manner of distribution of commodity from the main tank 30.

Figure 2:
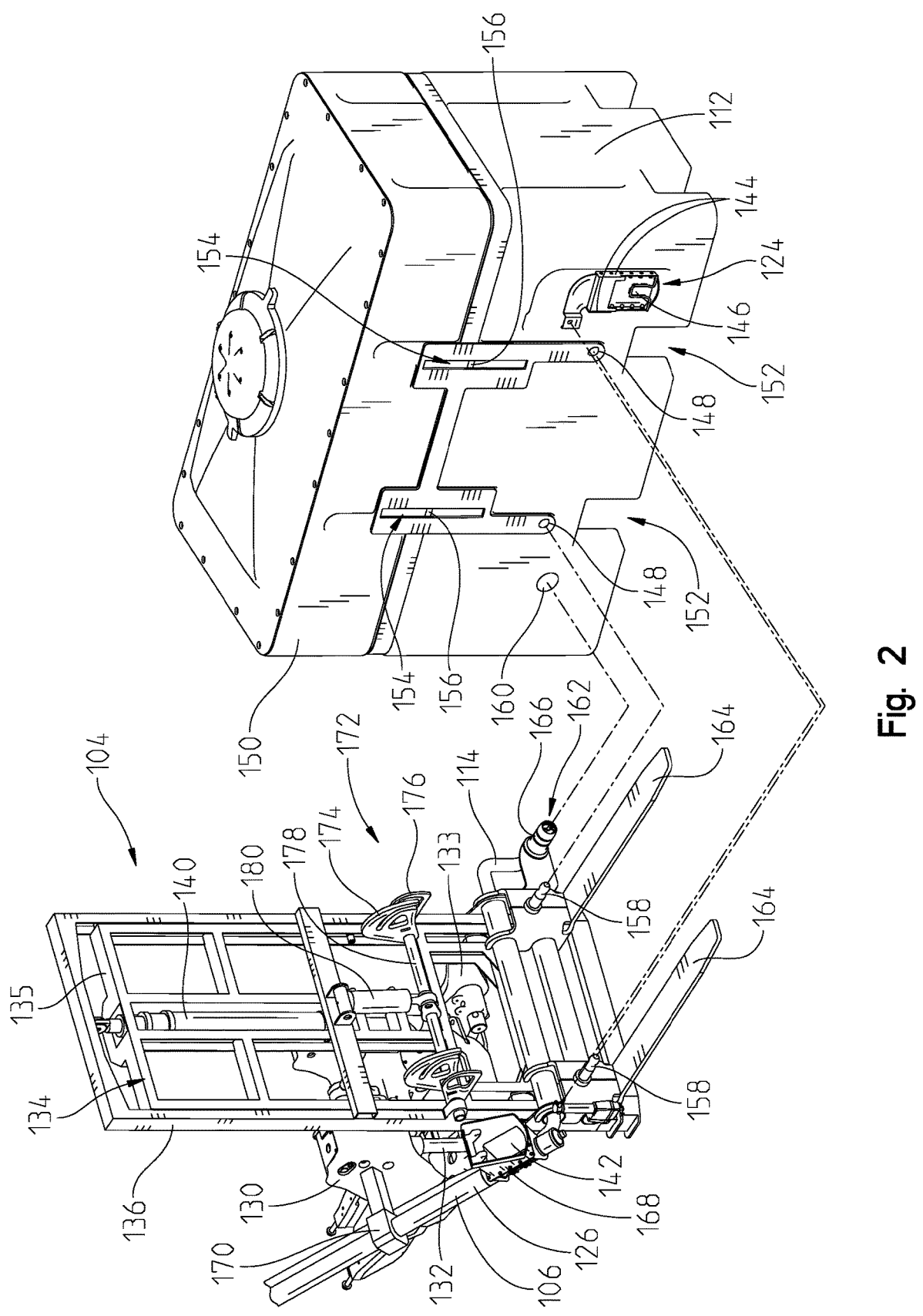
FIG. 2 is a right side front perspective view of the front frame and other components of the agricultural machine and a right side rear perspective view of the front tank.

Referring now to FIGS. 1 and 2, the tractor 102 includes a tractor frame 130 disposed at the front end 110 thereof. In the illustrative embodiment, the tractor frame 130 is fixed relative to the chassis 122. The front frame 104 is pivotable relative to the tractor frame 130 or relative to the front end 110 of the tractor 102. As suggested by FIG. 2, an actuator 132 is coupled at a first end to the tractor frame 130 and at a second end to the front frame 104, such that movement of the actuator 132 causing pivoting motion of the front frame 104 relative to the tractor frame 130.

Referring still to FIG. 2, the front frame 104 is comprised of an intermediate frame 134 and a fork lift frame 136. The intermediate frame 134 is pivotably coupled to the tractor frame 104 for pivoting motion based on extension and retraction of the actuator 132 as described above. In the illustrative embodiment, the intermediate frame 134 includes a first portion 133 that extends generally in the same direction as forks 164 of the fork lift frame 136, and a second portion 135 that extends substantially perpendicular to the forks 164 of the fork lift frame 136 and is positioned between the first portion 133 and the forks 164 of the fork lift frame 136. The actuator 132 is coupled to the first portion 133 of the intermediate frame 134.

Figure 3:
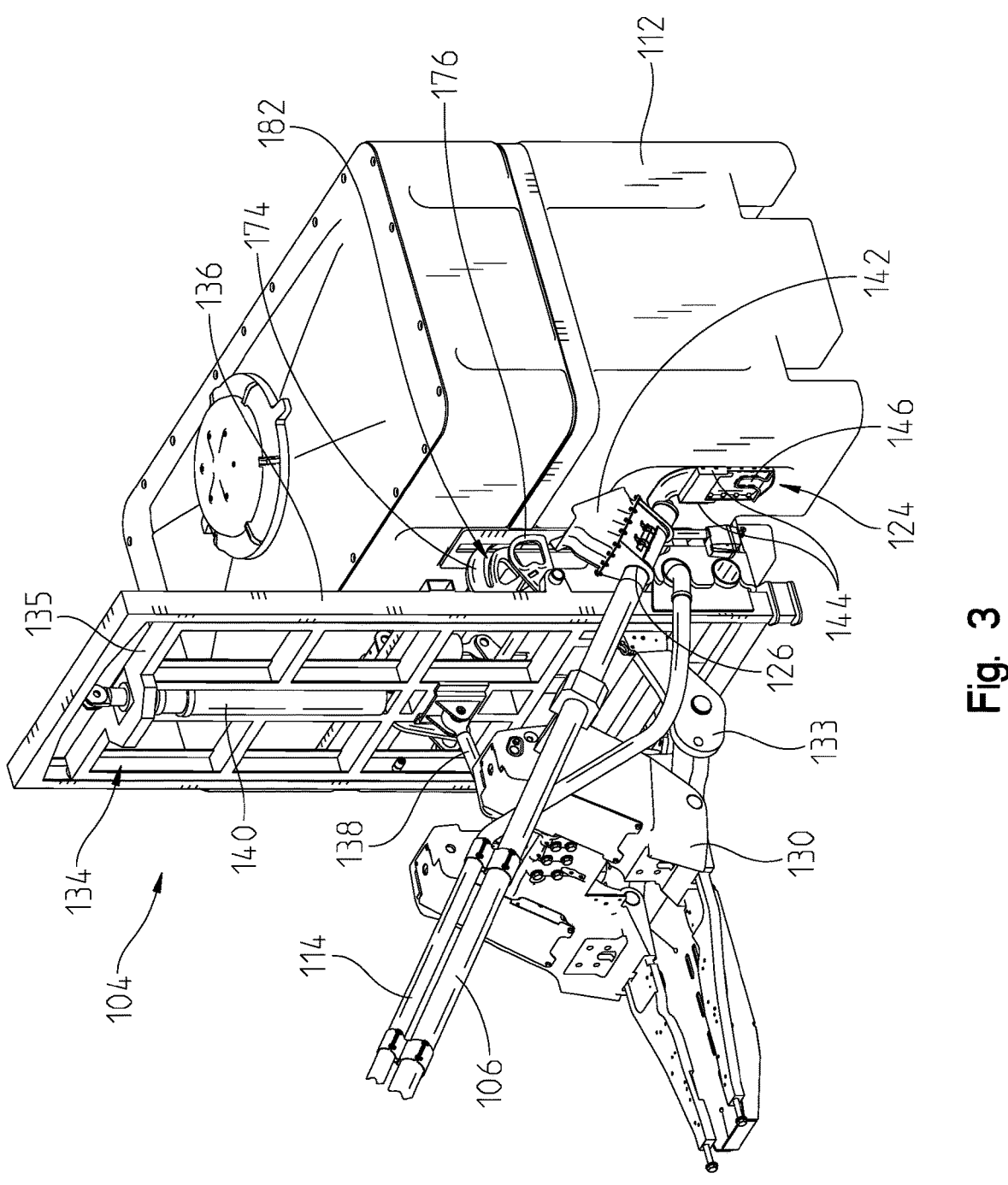
FIG. 3 is a right side rear perspective view of a tractor frame, the front frame, and the front tank, showing the front frame positioned at a first angle relative to the tractor frame.

As shown in FIG. 3, a telescoping cylinder 138 (e.g., an actuator) is pivotably coupled at its first end to a location of the tractor frame 130 that is spaced apart from the location on the tractor frame 130 at which the actuator 132 is coupled. The telescoping cylinder 138 is coupled at its second end to the second portion 135 of the intermediate frame 134. In embodiments in which the telescoping cylinder 138 is an actuator, the telescoping cylinder 138 extends and retracts to drive pivoting motion of the front frame 104. In some embodiments, the telescoping cylinder 138 is embodied as a follower such that the telescoping cylinder 138 provides support to the front frame 104 and extends and retracts as pivoting motion of the front frame 104 is driven by the actuator 132.

The fork lift frame 136 is slidably coupled to the intermediate frame 134. In the illustrative embodiment, the fork lift frame 136 is coupled to the intermediate frame 134 via an actuator 140, which is configured to extend and retract to adjust the height of the fork lift frame 136 relative to the intermediate frame 134. In the illustrative embodiment, the actuator 140 extends substantially parallel to the second portion 135 of the intermediate frame 134. In the illustrative embodiment, the height of the fork lift frame 136 may be adjusted relative to the intermediate frame 134 while the intermediate frame 134 remains fixed relative to the tractor frame 130.

Referring still to FIG. 2, a boot 142 is positioned at the inlet 126 of the supply line 106. In the illustrative embodiment, a portion of the supply line 106 (e.g., the inlet 126) and the boot 142 are fixedly coupled to the tractor frame 130 by a bracket 170. Referring still to FIG. 2, in the illustrative embodiment, the boot 142 is coupled to a clean out box 168 having a door which is openable to access and remove excess commodity.

In some embodiments, the supply line 106 and/or the boot 142 may be coupled to a vacuum device 314. In one example, the vacuum device 314 may be coupled between a compressed air source and the supply line 106. A first portion (i.e., upstream portion) of the supply line 106 is coupled between the vacuum device 314 and the front tank 112 and a second portion (i.e., downstream portion) of the supply line 106 is coupled between the vacuum device 314 and the main tank 30. In use, when the vacuum device 314 is switched on, compressed air flows into a chamber of the vacuum device 314, where it is then injected into the downstream portion of the supply line 106 towards the main tank 30. This injection creates a vacuum or suction in the upstream portion of the supply line 106 and the front tank 112. This vacuum or suction pulls commodity positioned in the front tank 112 into the chamber of the vacuum device 314 and ultimately through the supply line 106 toward the main tank 30.

As shown in FIG. 2, the boot 142 is sized and shape to fit over a pair of side rails 144, which are positioned along the sides of the outlet 124 of the front tank 112. The front tank 112 includes a gate 146 movable between a closed position shown in FIGS. 2-6 and an open position shown in FIG. 7. The gate 146 in the open position allows flow of commodity from a first interior portion of the front tank 112 to the supply line 106, and the gate 146 in the closed position prevents passage of commodity from the first interior portion of front tank 112 to the supply line 106. As shown in FIG. 2, when the gate 146 is in the closed position a portion of the gate 146 is positioned between the pair of side rails 144.

In the illustrative embodiments, the front tank 112 includes a second interior portion that is separate from the first interior portion. The front tank 112 also includes a secondary outlet 160, which facilitates flow of commodity from the second interior portion. As shown in FIG. 2, the secondary supply line 114 includes an inlet 162 formed in a nozzle 166 that is illustratively fixed relative to the fork lift frame 136 and configured to be inserted into the outlet 160 of the front tank 112 to form a seal therewith.

Referring still to FIG. 2, the front tank 112 further includes apertures 148, which are illustratively circular, formed in a rear side wall 150 of the front tank 112, a first pair of channels 152 formed in a bottom end of the front tank 112, and a second pair of channels or voids 154 formed in the rear side wall 150 of the front tank 112. Pins or catches 156 are positioned in and extend across each void 154. The fork lift frame 136 includes a pair of guide pins 158 configured to be inserted into the apertures 148 and a pair of forks 164 configured to be inserted in the channels 152. In the illustrative embodiment, when the forks 164 are positioned fully in the channels 152, the guide pins 158 are positioned in the apertures 148, and the nozzle 166 is positioned in the outlet 160 to form a seal therewith.

Figure 4:
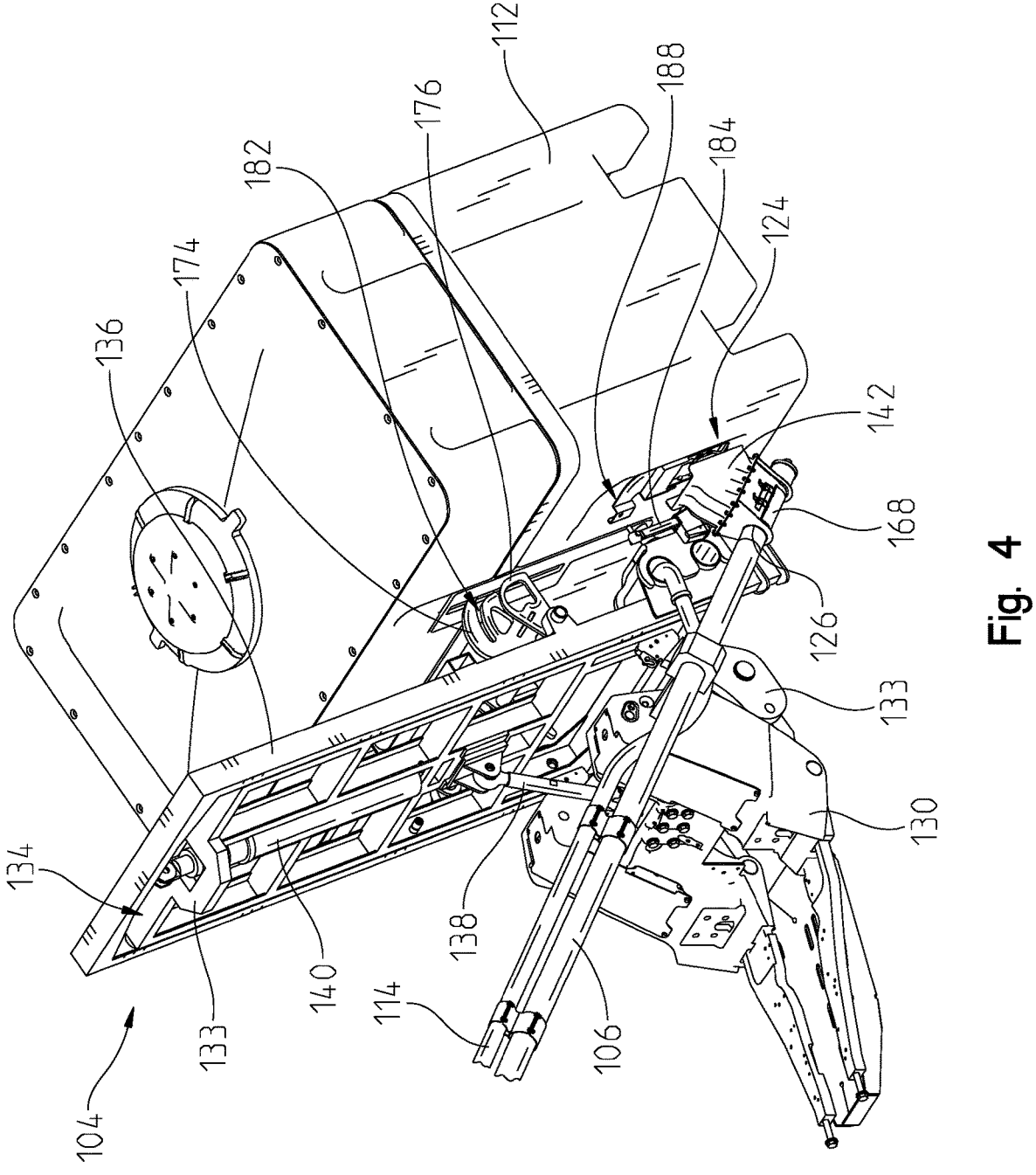
FIG. 4 is a right side rear perspective view similar to FIG. 3, showing the front frame positioned at a second angle relative to the tractor frame.

As shown in FIGS. 3 and 4, respectively, the front frame 104 is positionable at a first angle and a second angle relative to the tractor frame 130. In the illustrative embodiment, as shown in FIG. 3, when the front frame 104 is positioned at the first angle, the inlet 126 of the supply line 106 and the boot 142 are not aligned with the outlet 124 of the front tank 112. In the illustrative embodiment, as shown in FIG. 4, when the front frame 104 is positioned at the second angle, the inlet 126 of the supply line 106 and the boot 142 are aligned with the outlet 124 of the front tank 112. In this arrangement, the boot 142 is not in contact with the front tank 112. In some embodiments, the height of the fork lift frame 136 must be adjusted from a first height to a second height relative to the intermediate frame 134, and the front frame 104 must be at the second angle to align the inlet 126 of the supply line 106 and the boot 142 with the outlet 124 of the front tank 112.

Referring now to FIG. 2, a latch assembly 172 is shown, which includes a latch 174, a brace 176, and a rod 178. The latch assembly 172 is pivotable about a longitudinal axis of the rod 178, via extension and retraction of an actuator 180, which is coupled to the rod 178. In the illustrative embodiment, the actuator 180 is coupled at a first end to an arm that is in turn coupled to the rod 178 and at a second end to a cross bar that is in turn coupled to the fork lift frame 136 (i.e., to the front frame 104). As shown in FIG. 2, the latch assembly 172 illustratively includes a pair of latches 174 and a pair of braces 176, which are identical and each coupled to the rod 178 for pivoting motion therewith. Thus, reference will be made to only one latch 174 and only one brace 176 and should be understood to apply to both. The latch assembly 172 is shown in FIGS. 4-7 as well.

Figure 5:
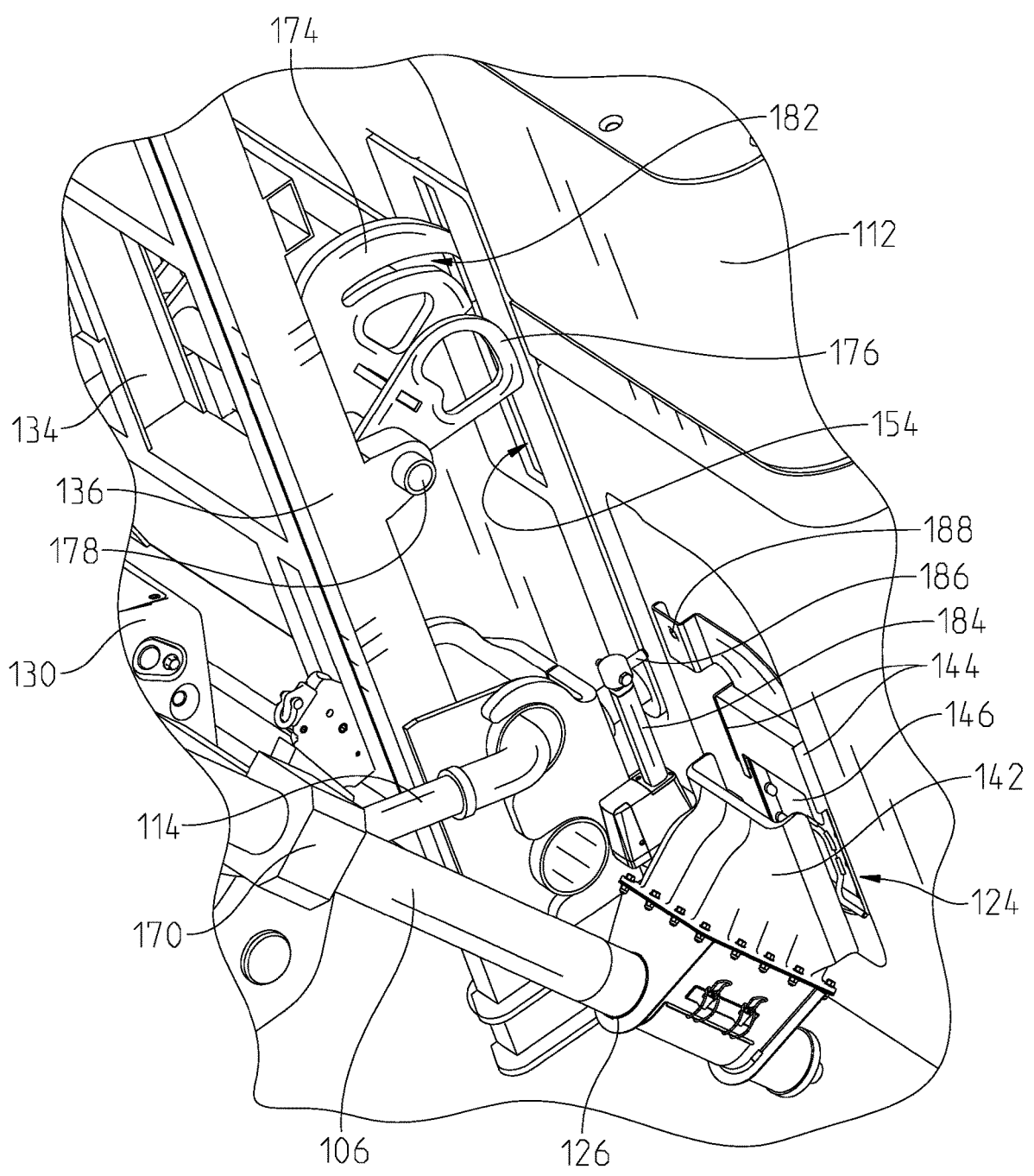
FIG. 5 is an enlarged perspective view of a portion of FIG. 4 showing the position of the supply line relative to the front tank and showing a latch assembly in a first position.
Figure 6:
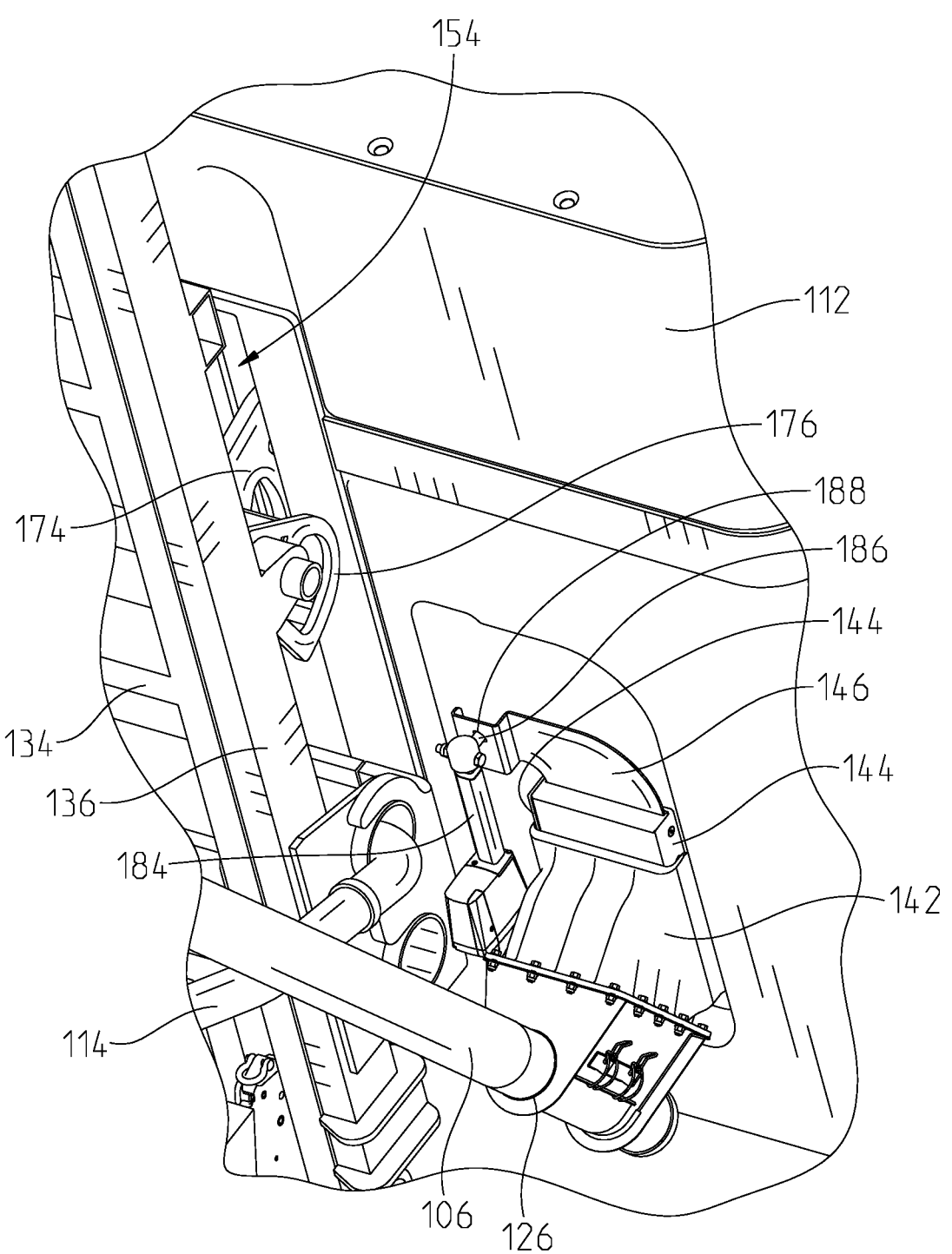
FIG. 6 is an enlarged perspective view similar to FIG. 5 showing the latch assembly in a second position engaged with the front tank and the supply line coupled to the front tank.

Reference is now made to FIG. 5, which is an enlarged view of a portion of FIG. 4, in which the front frame 104 is positioned at the second angle such that the inlet 126 of the supply line 106 and the boot 142 are aligned with the outlet 124 of the front tank 112, yet the boot 142 is not contacting the front tank 112. The latch 174 is pivotable relative to the front frame 104 from a first position as shown in FIG. 5 to a second position as shown in FIG. 6. In the first position of the latch 174, the supply line 106 is not coupled to the front tank 112, and in the second position of the latch 174, the supply line 106 is coupled to the front tank 112. It should be appreciated that in the illustrative embodiment, the supply line 106 is coupled to the front tank 112 via the boot 142. As suggested by FIGS. 5 and 6, when the front frame 104 is disposed at the second angle relative to the tractor frame 130, the latch 174 is configured to rotate into the void 154 of the front tank 112. In the illustrative embodiment, extension of the actuator 180 causes the latch 174 to rotate downwardly into the void 154.

As shown in FIG. 5, the latch 174 is formed to include a passageway or opening 182, which is illustratively curved. As shown in FIG. 2, the front tank 112 includes the pin or catch 156 that extends across the void 154. In use, as the latch 174 pivots relative to the front frame 104 from the first position to the second position, the latch 174 is advanced into the void 154 and the catch 156 advances into the opening 182 of the latch 174. The curved, elongated shape of the opening 182 causes the latch 174 to pull the catch 156 (and entire the front tank 112) towards the front frame 104 as the latch 174 pivots into the void 154. As a result, the side rails 144 or nearby portions of the front tank 112 are pulled into contact with the boot 142 such that the supply line 106 becomes coupled with the front tank 112.

As shown in FIGS. 2-7, the latch assembly 172 further includes the brace 176, which is fixed relative to the latch 174 for pivoting movement therewith relative to the front frame 104. As suggested by FIGS. 3-5, when the latch 174 is in the first position (and any position between the first and second position), the brace 176 contacts the front tank 112 at a location immediately adjacent the void 154 to prevent the front tank 112 from contacting the boot 142. As the latch 174 moves from the first position to the second position, a curved surface of the brace 176 slides along the front tank 112 allowing the front tank 112 to approach the boot 142. As shown in FIG. 6, when the latch 174 is in the second position, the boot 142 is in contact with the front tank 112.

Figure 7:
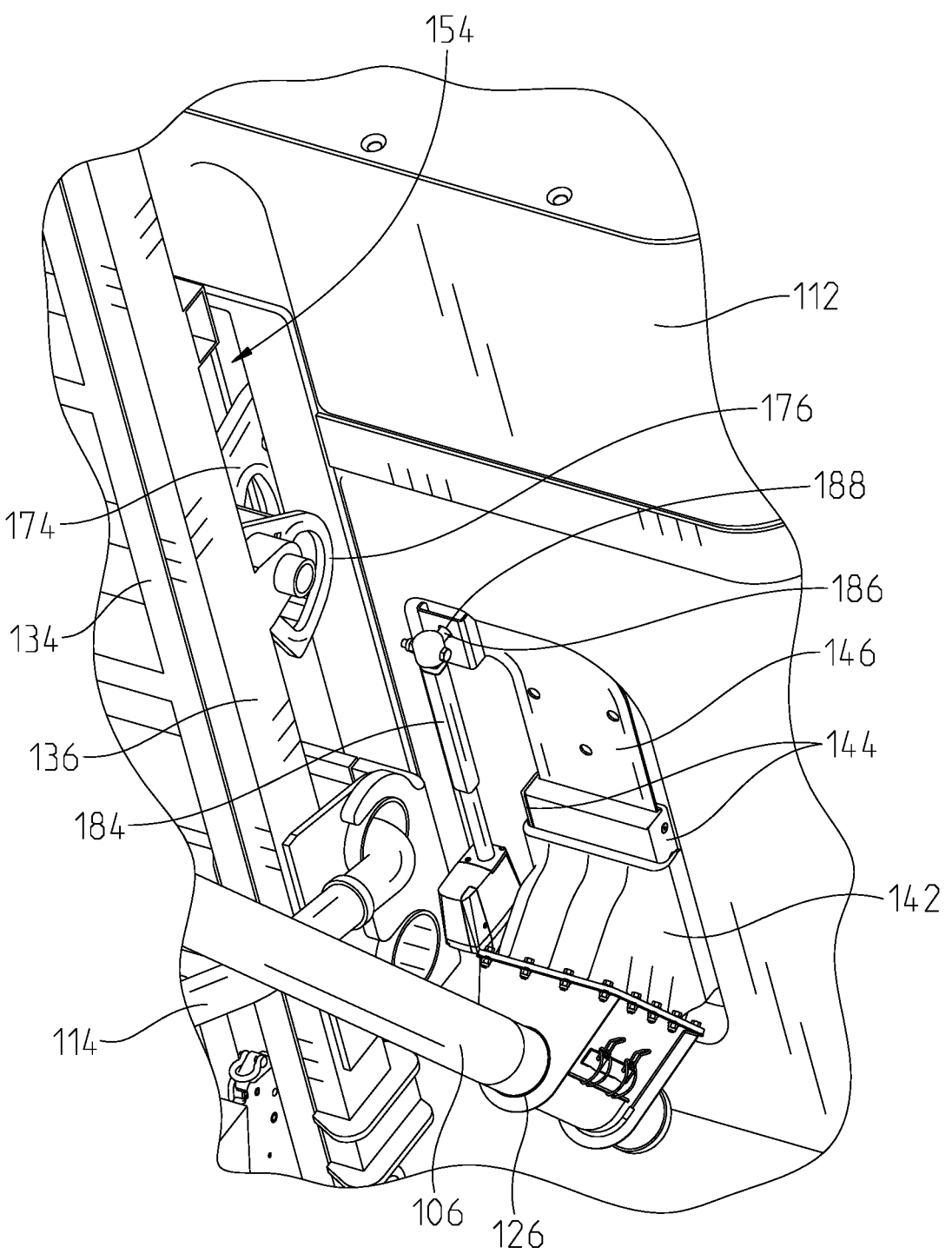
FIG. 7 is an enlarged perspective view similar to FIG. 6, showing the gate of the front tank in an open position.

As shown in FIGS. 4-7, the agricultural machine 10 further includes an actuator 184 configured to extend and retract. FIGS. 4-6 show the actuator 184 in the retracted position while FIG. 7 shows the actuator 184 in the extended position. The actuator 184 is fixedly coupled to the front frame 104, and in particular to the fork lift frame 136, for pivoting motion therewith relative to the front frame 130 of the tractor 102. The actuator 184 is coupled to the front frame 104 at its first end and includes a pin 186 at its second end. The pin 186 is configured to be inserted into an aperture 188 formed in the gate 146. The pin 186 is only aligned with the aperture 188 when the front frame 104 is positioned at the second angle relative to the tractor frame 130, and only inserted in the latch 174 when the latch 174 is in the second position. In other words, the pin 186 is only configured to engage the aperture 188 when the supply line 106 and the boot 142 are coupled to the front tank 112, which is shown in FIG. 6. In some embodiments, the height of the fork lift frame 136 must be adjusted from a first height to a second height relative to the intermediate frame 134, and the front frame 104 must be at the second angle for the pin 186 to engage the aperture 188.

The agricultural machine 10 may include a sensor 312, of a type known in the art, which may be positioned on the actuator 184, for example, that is configured to sense that the pin 186 is positioned in the aperture 188. In some embodiments, the sensor 312 may be included in the control system 300 and configured to send signals to a controller 302 indicating whether the pin 186 is positioned in the aperture 188. As shown in FIG. 7, when the pin 186 is positioned in the aperture 188, the actuator 184 extends to pull the gate 146 upward into the open position. This allows for flow of commodity into the supply line 106.

Figure 8:
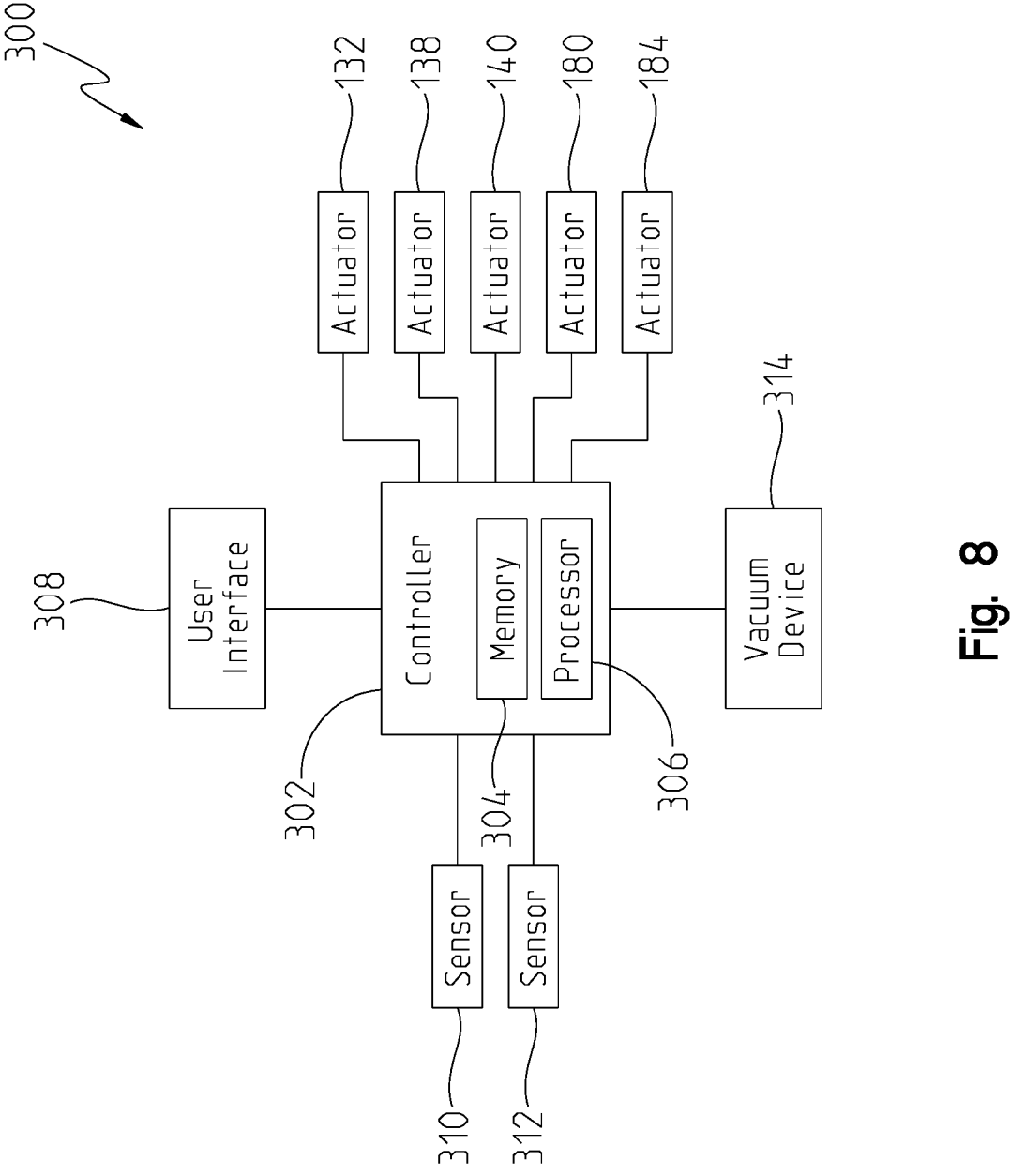
FIG. 8 is a diagrammatic view of control system for an agricultural machine, such as the agricultural machine of FIG. 1.

As shown in FIG. 8, the agricultural machine 10 may include a control system 300 that comprises one or more memories 304 included on and/or accessible by the controller 302, one or more processors 306 included on and/or accessible by the controller 302, and a user interface 308. The one or more processors 306 are configured to execute instructions (i.e., algorithmic steps) stored on the one or more memories 304. The controller 302 may be a single controller or a plurality of controllers operatively coupled to one another. The controller 302 may be housed by the agricultural machine 10 or positioned remotely, away from the agricultural machine 10. The controller 302 may be hardwired or connected wirelessly to other components of the agricultural machine 10 via Wi-Fi, Bluetooth, or other known means of wireless communication. The user interface 308 is operatively coupled to the controller 302 and configured to send signals to the controller 302 indicative of information supplied to the user interface 308 by a user.

Referring still to FIG. 8, the control system 300 may further include a sensor 310 and the sensor 312, each of which are operatively coupled to the controller 302. The sensor 310 may be positioned on the main tank 30, for example, and is configured to measure at least one of the volume of commodity in the main tank 30, the mass of commodity in the main tank 30, and the flow rate of commodity from the main tank 30. The sensor 310 is configured to send signals to the controller 302 indicative of the measured value associated with the main tank 30. The sensor 312 is configured to send signals to the controller 302 indicating whether the pin 186 is positioned in the aperture 188.

As shown in FIG. 8, the controller 302 is operatively coupled to the actuators 132, 138, 140, 180, 184 and configured to send signals thereto causing the actuators 132, 138, 140, 180, 184 to extend and retract. In some embodiments, the controller 302 sends such signals to the actuators 132, 138, 140, 180, 184 in response to signals received from the user interface 308, and in other embodiments, the controller 302 initiates certain actuations automatically in response to signals received from the sensors 310, 312.

As shown in FIG. 8, in some embodiments, the controller 302 is operatively coupled to the vacuum device 314. In use, the controller 302 is configured to switch the vacuum device on and off in response to the signals received from the sensors 310, 312. In one example, if the sensor 310 indicates that the volume or mass of commodity in the main tank 30 is below a predetermined threshold, and/or the sensor 312 indicates that the pin 186 is positioned in the aperture 188, then the controller 302 switches on the vacuum device 314 to transfer commodity from the front tank 112 to the main tank 30. If the sensor 310 indicates that the volume or mass of commodity in the main tank 30 is above a predetermined threshold, then the controller 302 switches off the vacuum device 314 to cease transferring commodity from the front tank 112 to the main tank 30. In this manner, commodity can be transferred from the front tank 112 to the main tank 30 only as it is needed by the main tank 30. As a result, commodity weight is uniquely positioned at the front end of the agricultural machine 10. It should be appreciated that when little or no commodity remains in the first front tank 112, the first front tank 112 may be replaced by additional, identical front tanks 112 having additional commodity for available for transfer.

Figure 9:
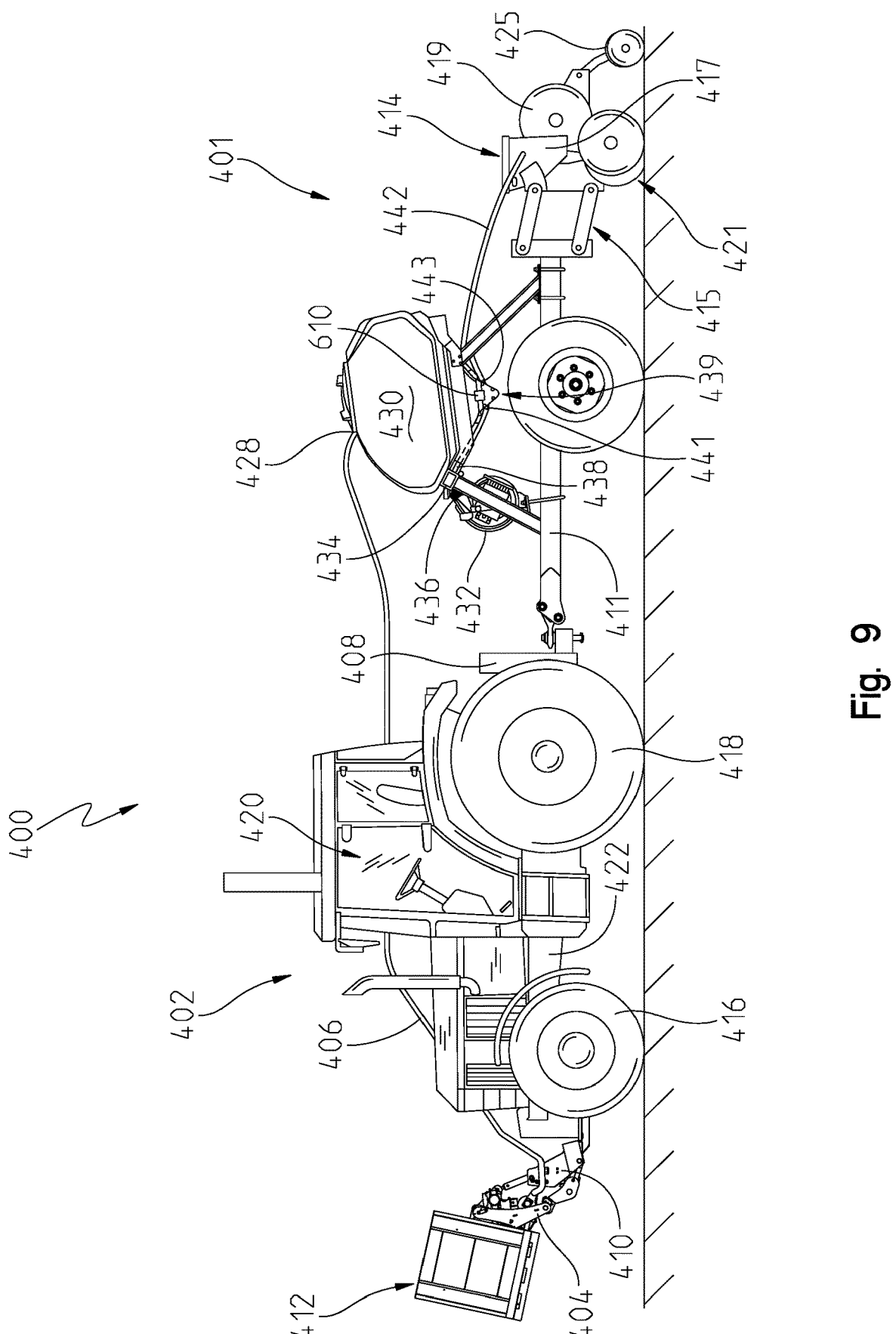
FIG. 9 is a side view of a front tank and agricultural machine having a tractor with a front frame, an implement with a main tank, and a supply line configured to transfer commodity from the front tank to the main tank.

Referring now to FIG. 9, an embodiment of an agricultural machine 400 is shown. In the illustrative embodiment, the agricultural machine 400 may be used for planting, fertilizing, or otherwise distributing commodity. The agricultural machine 400 includes an implement 401, a tractor 402, and a supply line 406. The tractor 402 includes front and rear ground engaging mechanisms 416, 418, which may be embodied as wheels, as shown in FIG. 9, or tracks. The tractor 402 includes a cab 420 that may house operator controls such as a user interface. The tractor 402 includes a chassis 422 that may support an engine and other components of the agricultural machine 400. It should be appreciated that the disclosure herein (e.g., regarding transfer of commodity) is applicable to agricultural machines having other configurations, and the agricultural machine 400 is exemplary in nature.

As shown in FIG. 9, the tractor 402 includes a rear end 408 and a front end 410, each of which are included in or fixed relative to the chassis 422. In the illustrative embodiment, the implement 401 is coupled to the rear end 408 of the tractor 402, and a front frame 404 is coupled to the front end 410 of the tractor 402. In some embodiments, a front tank 412 configured to store commodity is included in the agricultural machine 400. In other embodiments, the front tank 412 is a separate component from the agricultural machine 400. The front frame 404 is configured to support the front tank 412 above the ground and adjust the height and angle at which the front tank 412 is disposed. Movement of the front frame 404 relative to the front end 410 of the tractor 402 facilitates alignment between an outlet 424 of the front tank 412 and an inlet 426 of the supply line 406. As shown in FIG. 9, in some embodiments, when the supply line 406 is engaged with the front tank 412, a portion of the cab 420 is located at a greater height than the front tank 412 and the front frame 404 such that the front tank 412 and the front frame 404 do not block a forward-facing line of sight from the portion of the cab 420.

When the supply line 406 is engaged with the front tank 412, the supply line 406 is configured to transfer commodity from the front tank 412 to a main tank 430. In the illustrative embodiment, the main tank 430 is included on the implement 401. In other embodiments, the main tank 430 may be located on the tractor 402. As shown in FIG. 1, the supply line 406 includes an outlet 428 coupled to the main tank 430. In some embodiments, the main tank 430 may distribute commodity to row units 414, which distribute the commodity to the soil. In some embodiments, transfer of commodity to the main tank 430 via the supply line 406 occurs simultaneously with distribution of commodity from the main tank 430. As a result, commodity may be stored in the front tank 412 until needed for distribution from the main tank 430. Storing commodity in the front tank 412 allows for an unprecedented distribution of weight toward the front end 410 of the tractor 402, which reduces unwanted soil compaction and increases tractive efficiency.

Referring still to FIG. 9, in the illustrative embodiment, the implement 401 includes a main frame 411 to which one or more row units 414 are coupled. In FIG. 9, only a single row unit 414 is shown, but it should be appreciated that a plurality of row units 414 may be included in the implement 401 in a known manner. For example, the row units 414 may be coupled to the main frame 411 by a parallel-bar linkage 415 so that the row units 414 can move vertically relative to the main frame 411 during operation of the agricultural machine 400.

Each row unit 414 may include an auxiliary or secondary hopper 417 for holding commodity such as fertilizer, seed, chemical, or any other known commodity. In the illustrative embodiment, the secondary hopper 417 holds seed. As such, a seed meter 419 is shown for metering seed received from the secondary hopper 417. A furrow opener 421 may be provided on the row unit 414 for forming a furrow in a field for receiving metered seed from the seed meter 419. The seed may be transferred to the furrow from the seed meter 419 by a seed tube. A closing assembly 425, which is configured to close the furrow with the seed therein, is coupled to each row unit 414. It should be appreciated that this disclosure is applicable to implements and row units having other configurations and applicable to distribution of various commodities.

Referring still to FIG. 9, the main frame 411 of the implement 401 may the support main tank 430 and a fan 432. The fan 432 may be driven by a hydraulic motor. In other embodiments, other motor arrangements such as an electric motor may be used to drive the fan 432. The fan 432 can provide pressurized air to a manifold 434 through a main air hose 436. The manifold may include a plurality of manifold outlets corresponding to the number of row units 414 of the implement 401. In this embodiment, individual air supply lines 438 may extend from the manifold outlets and direct pressurized air from the manifold 434 to an upstream side of a nozzle assembly 439. The nozzle assembly 439 may be located at a lower or bottom portion of the main tank 430 as shown.

Commodity in the main tank 430 may flow by gravity to the nozzle assembly 439. The upstream side of the nozzle assembly 439 is provided with a number of air inlets 441 corresponding to the number of air supply hoses 438. The air inlets 441 may be spaced transversely along the upstream side of the nozzle assembly 439. The downstream side of the nozzle assembly 439 may be provided with a number of commodity outlets 443 also corresponding to the number of air supply hoses 438. The commodity outlets 443 may also be spaced transversely along the downstream side of the nozzle assembly 439. As shown in FIG. 9, distribution supply hoses 442 may be coupled to and extend from the commodity outlets 443 to the individual secondary hoppers 417 for directing commodity entrained in the air stream to the secondary hoppers 417. It should be appreciated that in other embodiments, commodity may be distributed from the main tank 430 in other ways known in the art, and this disclosure is not limited to any particular manner of distribution of commodity from the main tank 430.

Figure 10:
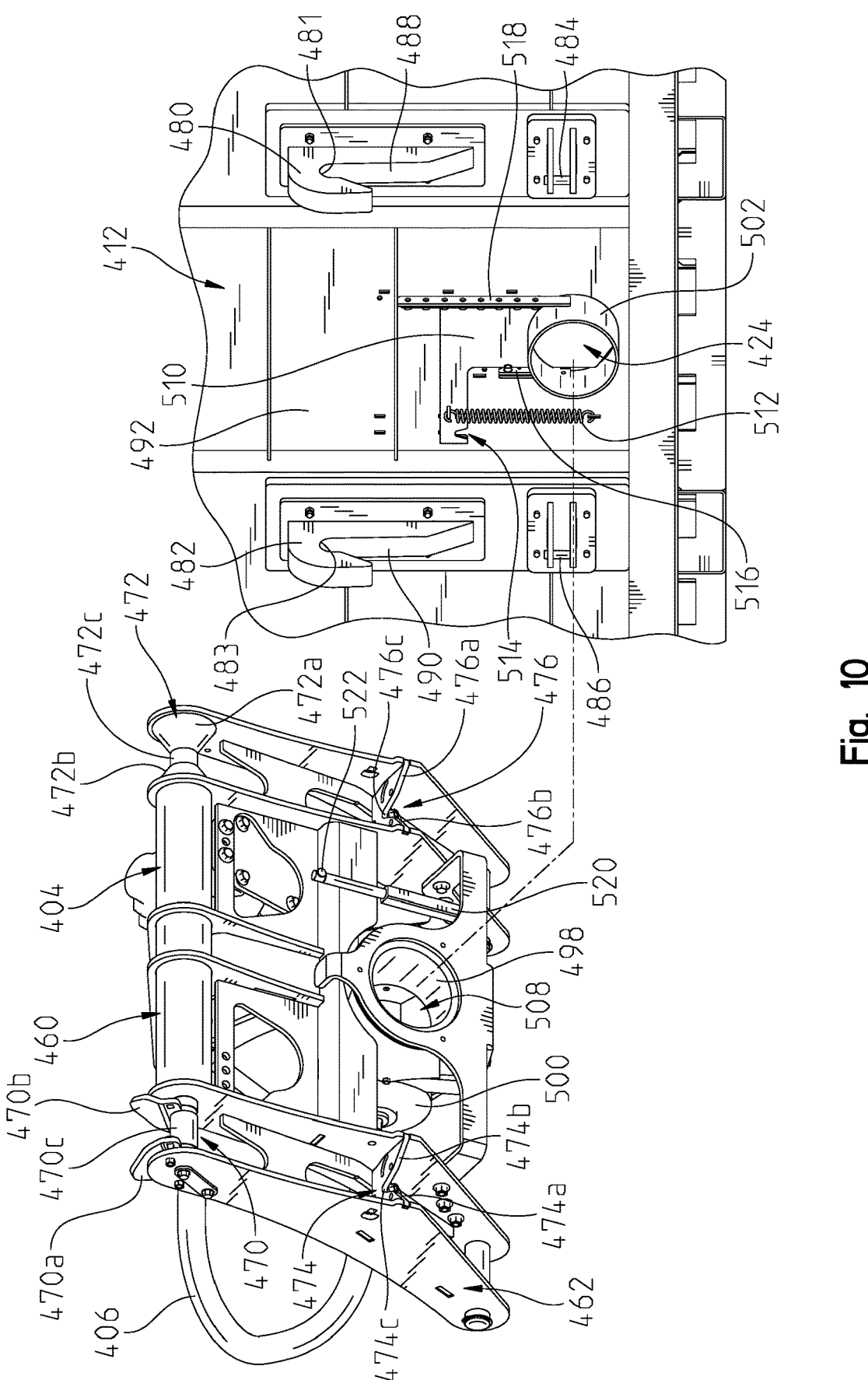
FIG. 10 is a front perspective view of the front frame of FIG. 9 and a rear perspective view of a portion of the front tank of FIG. 9.
Figure 11:
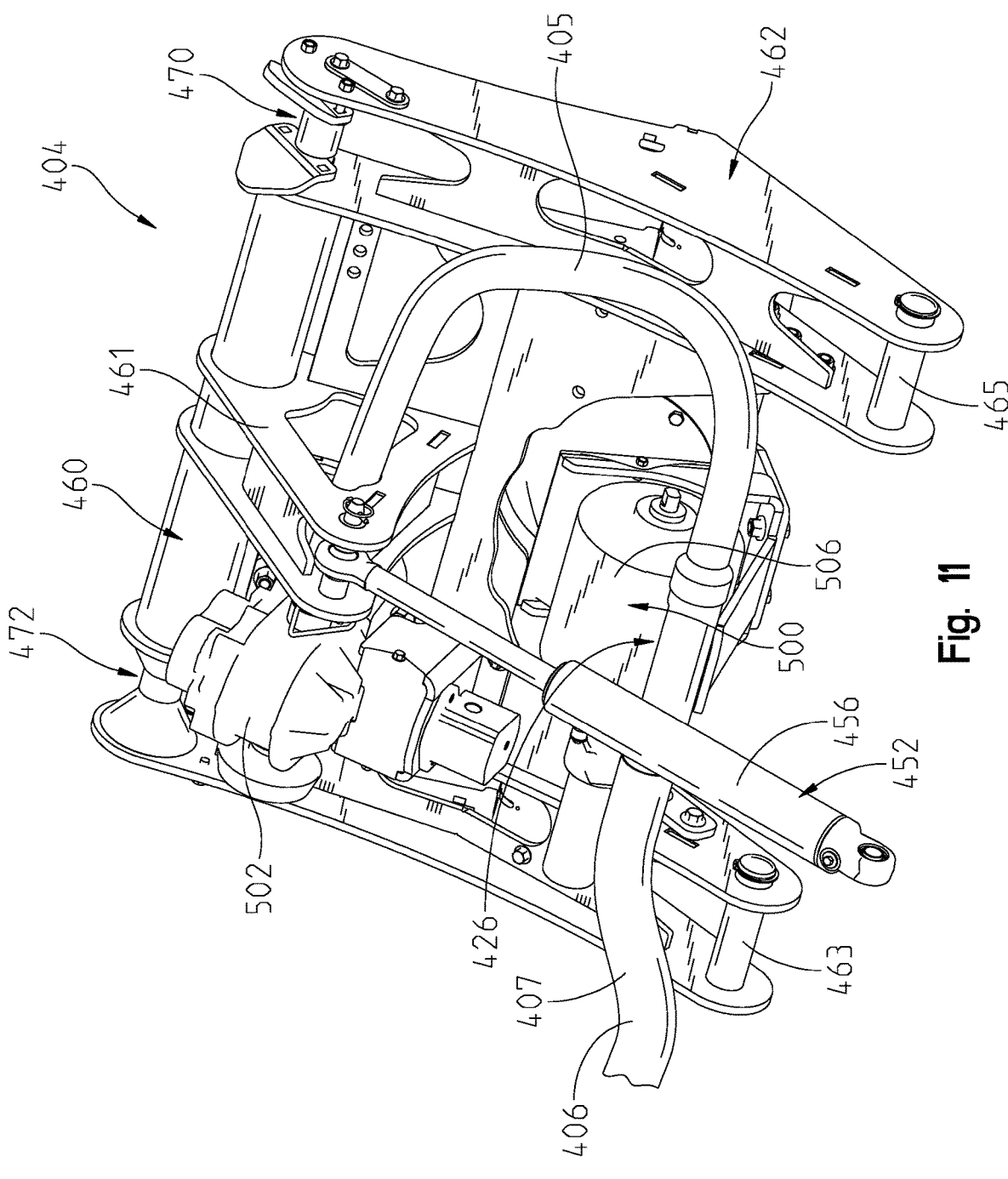
FIG. 11 is a rear perspective view of the front frame of FIGS. 9-10.
Figure 12:
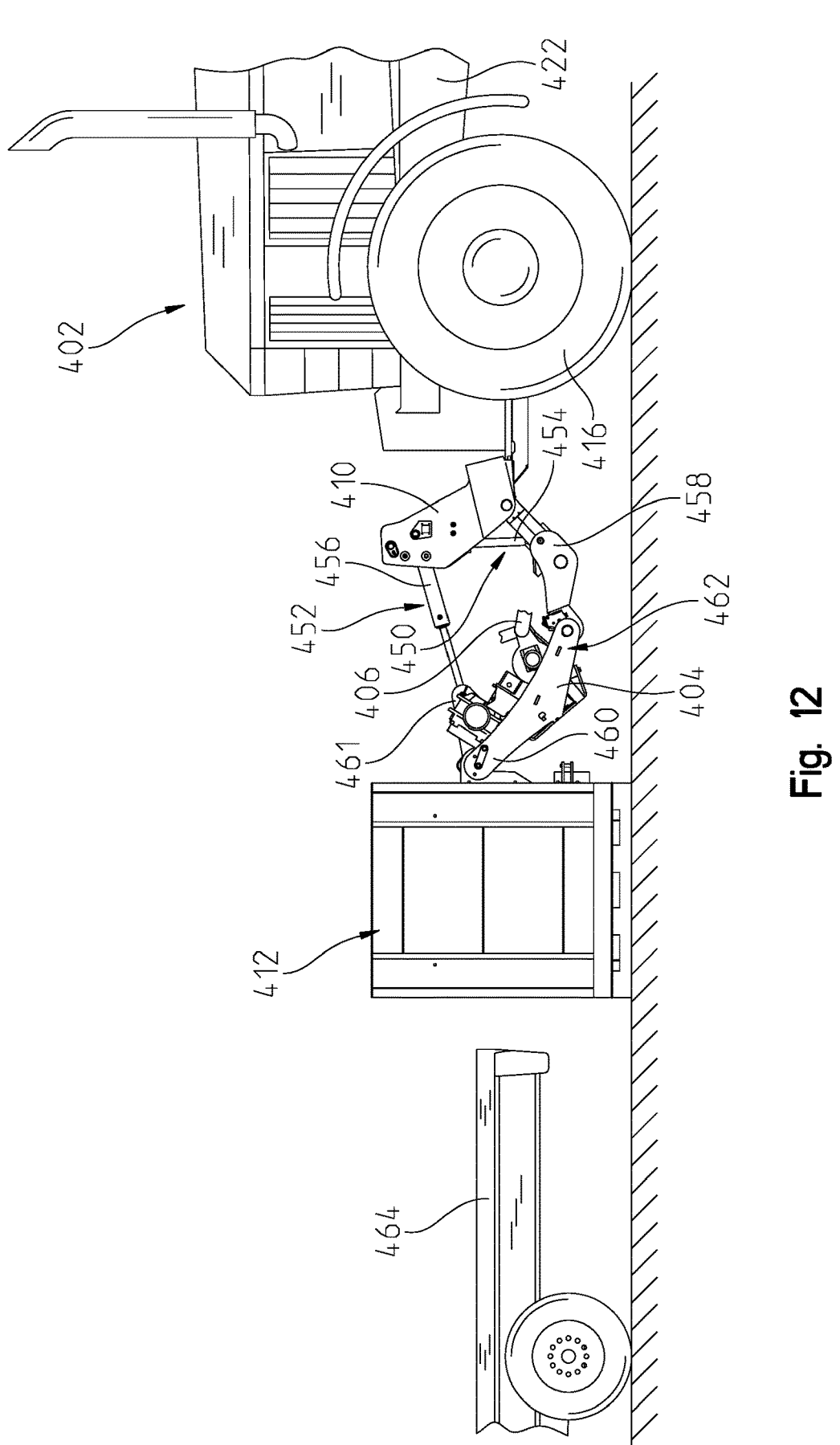
FIG. 12 is a side view of the front tank positioned on the ground and engaged with a top portion of the front frame of FIGS. 9-11, where the front tank is not engaged with the supply line.
Figure 13:
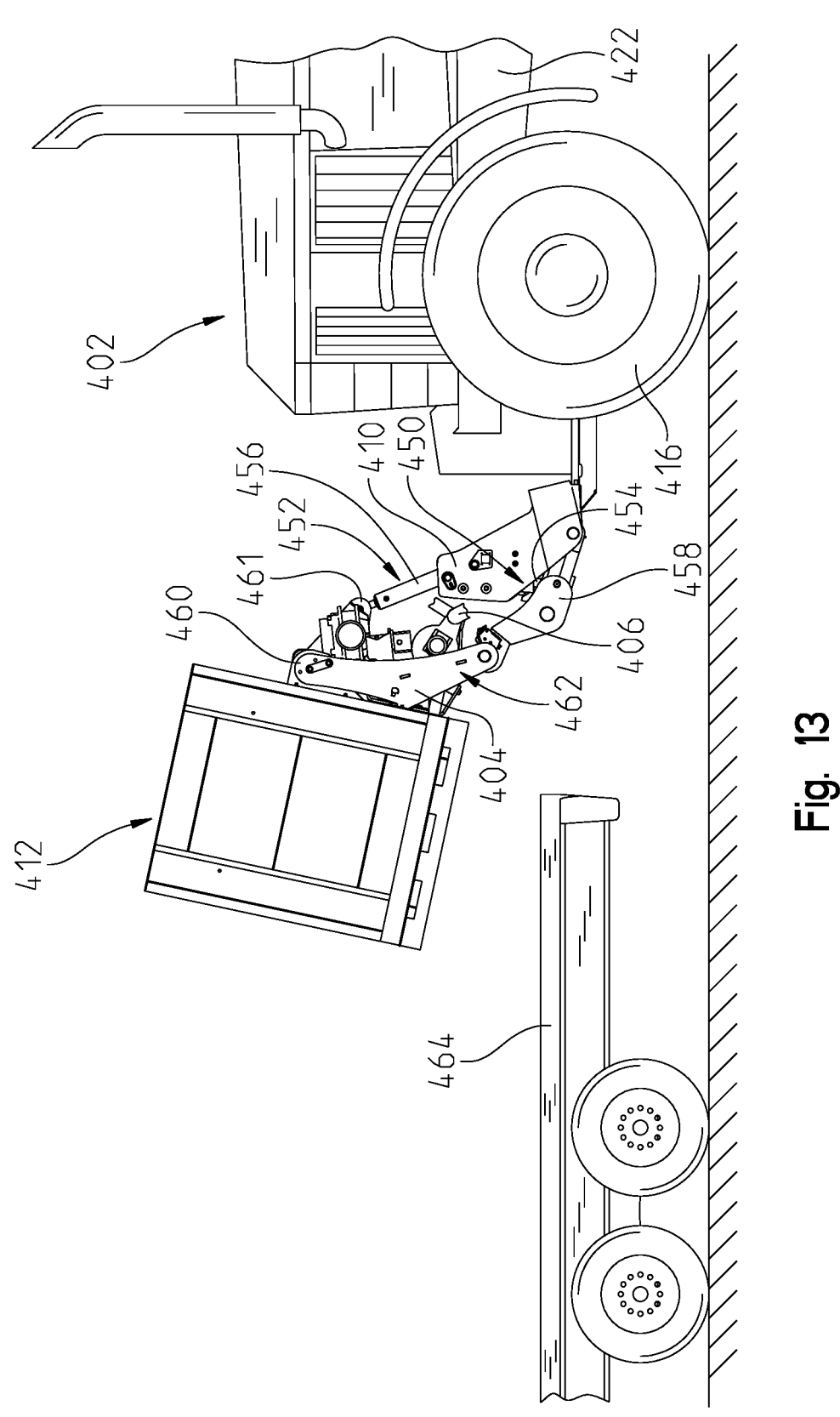
FIG. 13 is a side view of the front tank supported above the ground by the front frame and engaged with the supply line.
Figure 14:
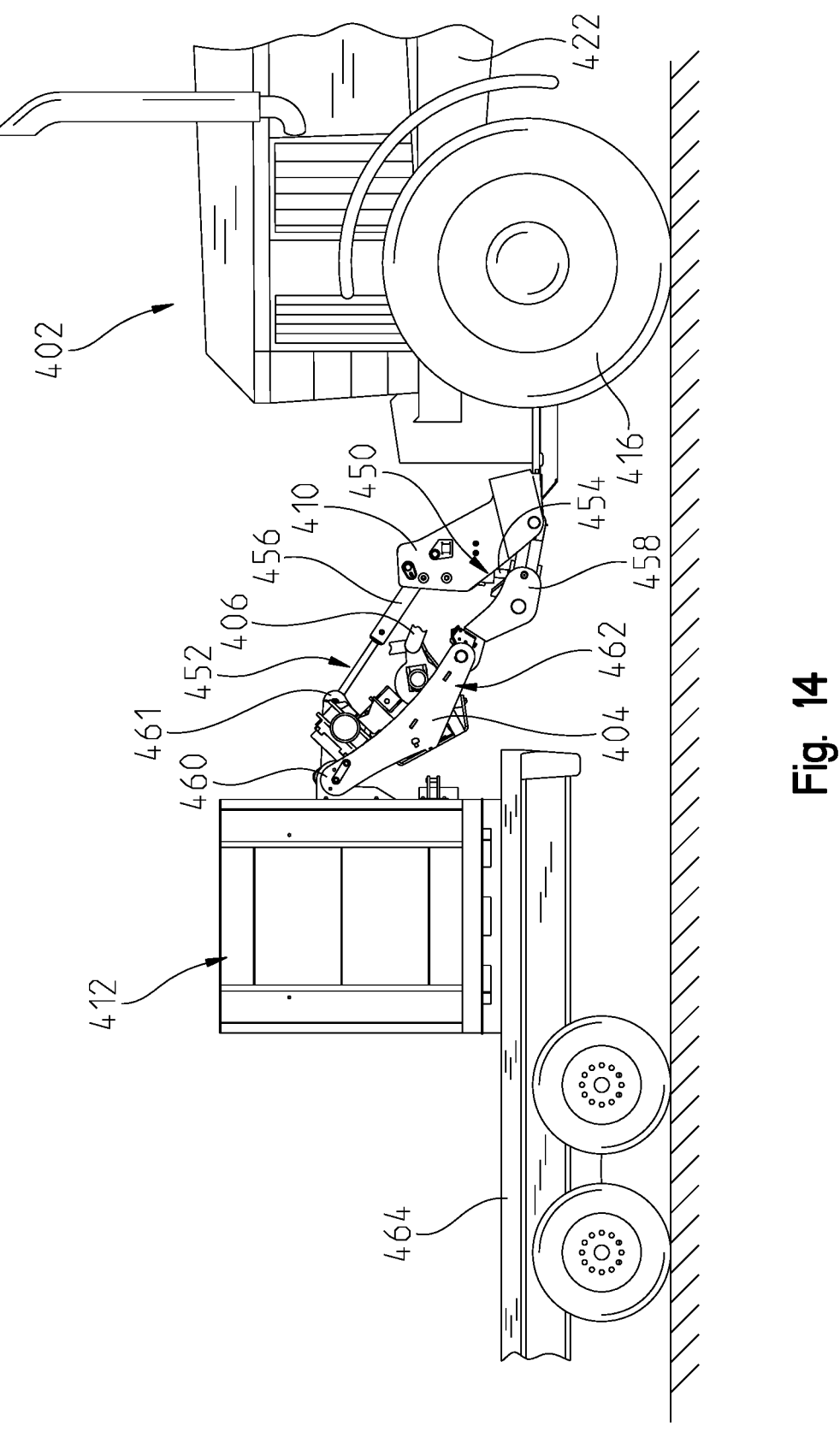
FIG. 14 is a side view of the front tank engaged with the top portion of the front frame, positioned on a trailer above the ground, and not engaged with the supply line.

As shown in FIGS. 10-14, the front frame 404 includes an upper portion 460 and a lower portion 462 that is arranged at a lesser height than the upper portion 460 throughout operation of the agricultural machine 400. As shown in FIGS. 12-14, the front frame 404 is movable relative to the front end 410 of the tractor 402. The agricultural machine 400 includes a first actuation assembly 450 and a second actuation assembly 452 that is separate from the first actuation assembly 450 and. The first actuation assembly 450 includes at least one actuator 454 configured to extend and retract to move the front frame 404 relative to the front end 410 of the tractor 402. The second actuation 452 assembly includes at least one actuator 456 configured to extend and retract to move the front frame 404 relative to the front end 410 of the tractor 402. In the illustrative embodiment, the first actuation assembly 450 is located at a lower height than the second actuation assembly 452 throughout operation of the agricultural machine 400.

As shown in FIGS. 12-14, the first actuation assembly 450 includes a base 458 having a first end pivotably coupled to the front end 410 of the tractor 402 and a second end pivotably coupled to the lower portion 462 of the front frame 404. In some embodiments, the second end of the base 458 is pivotable coupled to separate rods 463, 465 of the lower portion 462 of the front frame 404, which are shown in FIG. 11. In the illustrative embodiment, the at least one actuator 454 is pivotably coupled at a first end to the front end 410 of the tractor 402 and pivotably coupled at a second end to the base 458. The second end of the at least one actuator 454 is coupled to the base 458 at a location between the first and second ends of the base 458. The second actuation assembly 452 is pivotably coupled at a first end to the front end 410 of the tractor 402 and at a second end to the upper portion 460 of the front frame 404. In the illustrative embodiment, as shown in FIGS. 11-14, the second end of the second actuation assembly 452 is pivotably coupled to a bracket 461 that positioned on a rear side of the front frame 404 on the upper portion 460 of the front frame 404.

In the illustrative embodiment, the at least one actuator 454 of the first actuation assembly 450 is configured to extend to move the front frame 404 downward relative to the front end 410 of the tractor 420 and configured to retract to move the front frame 404 upward relative to the front end 410 of the tractor 402. In the illustrative embodiment, the at least one actuator 456 of the second actuation assembly 452 is configured to extend move the upper portion 460 of the front frame 404 away from the front end 410 of the tractor 402 and configured to retract to move the upper portion 460 of the front frame 404 toward the front end 410 of the tractor 402.

FIG. 12 shows the at least one actuator 454 of the first actuation assembly 450 in an extended position and the at least one actuator 456 of the second actuation assembly 452 in an extended position, for example, to engage the front tank 412 when the front tank 412 is located on the ground. FIG. 13 shows the at least one actuator 454 of the first actuation assembly 450 in a retracted position and the at least one actuator 456 of the second actuation assembly 452 in a retracted position to support the front tank 412 above the ground, for example, during an agricultural operation or, for example, to lift the front tank 412 above a trailer 464 or other surface above ground. FIG. 14 shows the at least one actuator 454 of the first actuation assembly 450 in a partially extended position and the at least one actuator 456 of the second actuation assembly 452 in the extended position, for example, to position the front tank 412 on the trailer 464. In the use, the actuation assemblies 450, 452 may be operated (e.g., the at least one actuators 454, 456 may be extended and retracted) simultaneously or at different times to engage with, rotate, support, relocate, re-rotate, and disengage with the front tank 412.

As shown in FIGS. 10-11, the front frame 404 includes brackets 470, 472, 474, 476. The upper portion 460 of the front frame 404 includes a first pair of brackets (i.e., brackets 470, 472) and the lower portion 462 of the front frame 404 includes a second pair of brackets (i.e., brackets 474, 476). In the illustrative embodiment, each bracket 470, 472, 474, 476 is configured to receive a corresponding cantilever 480, 482, 484, 486 of the front tank 412.

In the illustrative embodiment, the cantilevers 480, 482 are embodied as hooks extending outwardly from a back wall 492 of the front tank 412. As shown in FIG. 10, each hook 480, 482 includes a guide wall 488, 490, respectively, configured to slide along the brackets 470, 472, respectively, as the brackets 470, 472 move into engagement with the hooks 480, 482. The guide walls 488, 490 extend to u-shaped interior portions 481, 483 of the hooks 480, 482, respectively, which are configured to be located above and in contact with middle portions the brackets 470, 472, respectively, when the front frame 404 is engaged with the front tank 412. In use, when the hooks 480, 482 are engaged with the brackets 470, 472, the hooks 480, 482 are configured to rotate relative to the brackets 470, 472 to move the supply line 406 into engagement with the front tank 412. In the illustrative embodiment, the cantilevers 484, 486 are embodied as vertically extending posts spaced apart from the back wall 492 of the front tank 412. The posts 484, 486 are configured to contact middle portions of the brackets 474, 476, respectively, when the front frame 404 is engaged with the front tank 412. When the posts are 484, 486 are in contact with the middle portions of the brackets 474, 476, the supply line 406 is engaged with the front tank 412.

In the illustrative embodiment, each bracket 470, 472, 474, 476 is v-shaped such that each bracket 470, 472, 474, 476 includes a pair of outer edges that converge to a middle portion of the bracket located between the outer edges. For example, the bracket 470 includes outer edges 470a, 470b and a middle portion 470c positioned between the outer edges 470a, 470b. The bracket 472 includes outer edges 472a, 472b and a middle portion 472c positioned between the outer edges 472a, 472b. The bracket 474 includes outer edges 474a, 474b and a middle portion 474c positioned between the outer edges 474a, 474b. The bracket 476 includes outer edges 476a, 476b and a middle portion 476c positioned between the outer edges 476a, 476b. As shown in FIG. 10, the outer edges of each bracket 470, 472 converge as the outer edges of the brackets 470, 472 extend downwardly toward the respective middle portions of the brackets 470, 472. As shown in FIG. 10, the outer edges of each bracket 474, 476 converge as the outer edges of the brackets 474, 476 extend rearwardly toward the respective middle portions of the brackets 474, 476.

As shown in FIG. 10, the brackets 470, 472 include vertically extending channels configured to receive the cantilevers 480, 482 (e.g., hooks) of the front tank 412. The v-shaped channel configuration of the brackets 470, 472 allows for the cantilevers 480, 482 to initially contact any portion of the outer edges of the brackets 470, 472 and advance to the middle portions 470c, 472c of the brackets 470, 472 as the front frame 404 moves into engagement with the front tank 412. As shown in FIG. 10, the brackets 474, 476 include horizontally extending channels configured to receive the cantilevers 484, 486 (e.g., posts) of the front tank 412. The v-shaped channel configuration of the brackets 474, 476 allows for the cantilevers 484, 486 to initially contact any portion of the outer edges of the brackets 474, 476 and advance to the middle portions 474c, 476c of the brackets 474, 476 as the front frame 404 moves into engagement with the front tank 412.

In the illustrative embodiment shown in FIG. 10, the outer edges 470a, 470b of the bracket 470 are embodied as plates arranged at an angle relative to the middle portion 470c, which is embodied as a cylinder. In the illustrative embodiment shown in FIG. 10, the outer edges 472a, 472b of the bracket 472 are frustoconical in shape, narrowing to the middle portion 472c, which is embodied as a cylinder. It should be appreciated that in some embodiments, the brackets 470, 472 have the same structure as one another, which may be either the structure of bracket 470 or the structure of bracket 472 shown in FIG. 10.

Referring still to FIGS. 10-11, in the illustrative embodiment, the agricultural machine 400 includes a meter 500 fixed to the front frame 404 for movement therewith. The front frame 404 includes an channel defined by a sidewall 498 configured to receive a collar 502 of the front tank 412 when the frame 404 is engaged with the front tank 412. The meter 500 includes a housing 506 surrounding an interior of the meter 500. The housing 506 includes an opening 508 that opens to the interior of the meter 500 and is aligned with the channel of the front frame 404. The inlet 426 of the supply line 406 opens to the interior of the housing 506. The meter 500 includes rotating paddles positioned in the interior and configured to convey commodity received from the front tank 412 to the supply line 406.

In some embodiments, as shown in FIG. 11, the supply line 406 may be coupled to an airflow device 502. The airflow device 502 is configured to provide airflow through the supply line 406. In one example, the airflow device 502 may be coupled to a compressed air source and may use compressed air from the compressed air source to provide airflow through the supply line 406. In another example, the airflow device 502 may be a fan or fan assembly such as a blower. In the illustrative embodiment, as shown in FIG. 11, a first portion 405 of the supply line 406 extends from the air flow device 502 to the meter 500, and a second portion 407 of the supply line 406 extends from the meter 500 to the main tank 430. In use, when the airflow device 502 is switched on, commodity is urged by the airflow to move through the second portion 407 of the supply line 406 from the meter 500 to the main tank 430. In some embodiments, the airflow provided by the airflow device 502 may create a vacuum or suction within the interior of the meter 500, which further facilitates movement of commodity into and through the meter 500.

Figure 15:
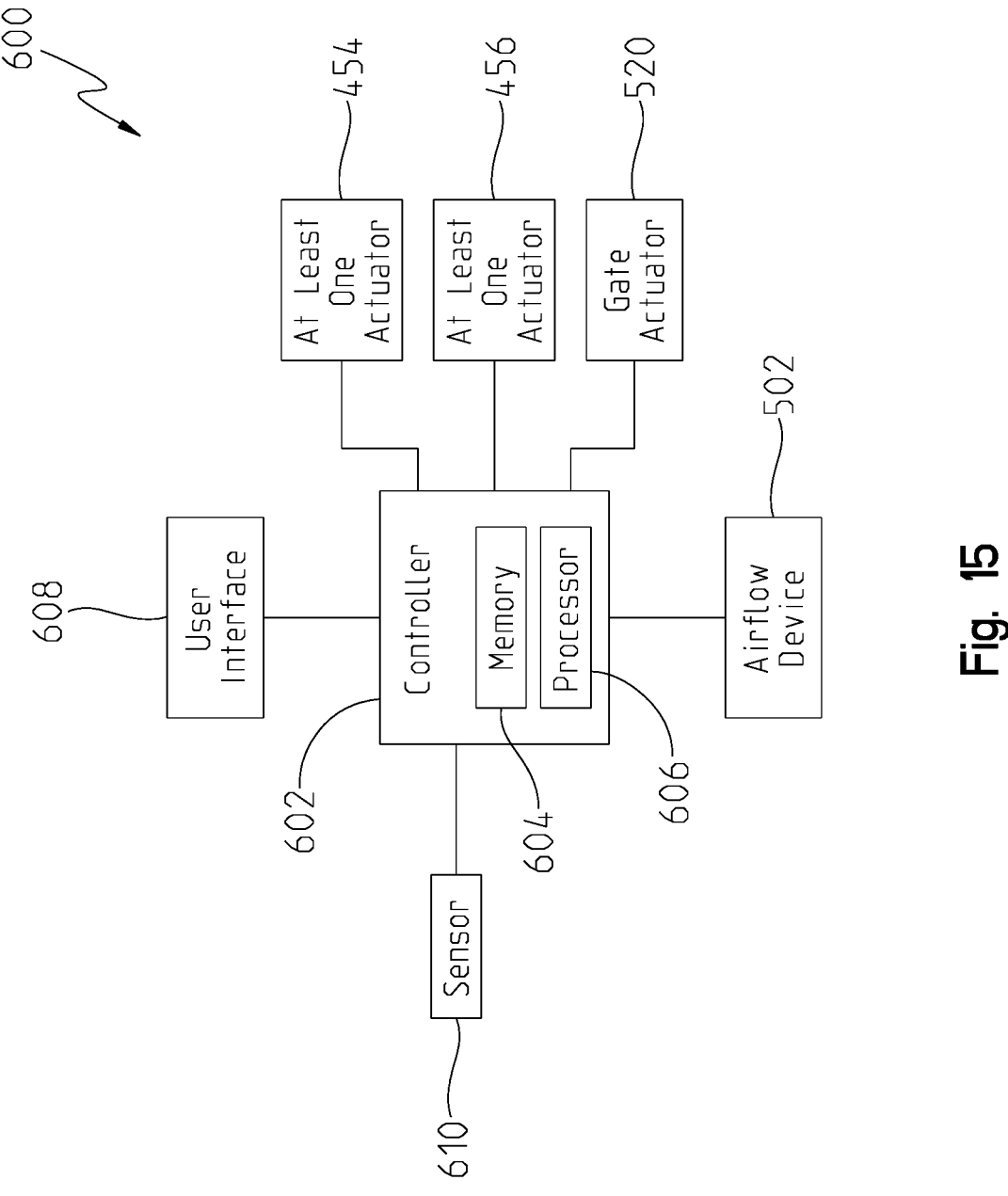
FIG. 15 is a diagrammatic view of control system for an agricultural machine, such as the agricultural machine of FIG. 9.

As shown in FIG. 15, in some embodiments, the agricultural machine 400 includes a control system 600 that comprises one or more memories 604 included on and/or accessible by the controller 602, one or more processors 606 included on and/or accessible by the controller 602, and a user interface 608. The one or more processors 606 are configured to execute instructions (i.e., algorithmic steps) stored on the one or more memories 604. The controller 602 may be a single controller or a plurality of controllers operatively coupled to one another. The controller 602 may be housed by the agricultural machine 400 or positioned remotely, away from the agricultural machine 400. The controller 602 may be hardwired or connected wirelessly to other components of the agricultural machine 400 via Wi-Fi, Bluetooth, or other known means of wireless communication. The user interface 608 is operatively coupled to the controller 602 and configured to send signals to the controller 602 indicative of information supplied to the user interface 608 by a user.

Referring still to FIG. 15, the control system 600 may further include a sensor 610 that is operatively coupled to the controller 602. The sensor 610 may be positioned on the main tank 430, for example, as shown in FIG. 9. In the illustrative embodiment, the sensor 610 is configured to measure at least one of the volume of commodity in the main tank 430, the mass of commodity in the main tank 430, and the flow rate of commodity from the main tank 430. The sensor 610 is configured to send signals to the controller 602 indicative of the measured value associated with the main tank 430.

As shown in FIG. 15, the controller 602 is operatively coupled to the at least one actuators 454, 456 and configured to send signals thereto causing the at least one actuators 454, 456 to extend and retract. In some embodiments, the controller 602 sends such signals to the at least one actuators 454, 456 in response to signals received from the user interface 608, and in other embodiments, the controller 602 causes actuation automatically in response to signals received from the sensor 610.

As shown in FIG. 15, in some embodiments, the controller 602 is operatively coupled to the airflow device 502. In use, in some embodiments, the controller 602 is configured to switch the airflow device 502 on and off in response to signals received from the user interface 608. In use, in some embodiments, the controller 602 is configured to switch the airflow device on and off in response to the signals received from the sensors 610. In one example, if the sensor 610 indicates that the volume or mass of commodity in the main tank 430 is below a predetermined threshold, then the controller 602 switches on the airflow device 502 to transfer commodity from the front tank 412 to the main tank 430. If the sensor 610 indicates that the volume or mass of commodity in the main tank 430 is above a predetermined threshold, then the controller 602 switches off the airflow device 502 to cease transferring commodity from the front tank 412 to the main tank 430. In this manner, commodity can be transferred from the front tank 412 to the main tank 430 only as it is needed by the main tank 430 to the row units 414. As a result, more commodity weight is positioned at the front end of the agricultural machine 400 as compared to the weight distribution of conventional agricultural machines. It should be appreciated that when little or no commodity remains in the front tank 412, the front tank 412 may be replaced by additional, substantial identical front tanks having additional commodity for available for transfer.

Referring again to FIG. 10, a rear side of a portion of the front tank 412 is shown. The front tank 412 includes a gate 510 that is movable relative to a back wall 492 of the front tank 412 between a closed position (shown in FIG. 10) in which the gate 510 blocks an outlet 424 of the front tank 412 and an open position in which the gate 510 does not block the outlet 424 of the front tank 412. The front tank 412 further includes guide rails 516, 518 coupled to the back wall 492. The gate 510 is coupled between the guide rails 516, 518 and configured to slide vertically along the guide rails 516, 518 between the open and closed positions. The front tank 412 includes a spring 512 coupled at a first end to the back wall 492 of the front tank 412 and at a second end to the gate 510. The spring 512 pulls downward on the gate 510 to bias the gate 510 to the closed position. The gate 510 further includes a cutout 514, which include illustrative embodiment is v-shaped, narrowing to a middle portion thereof.

Referring still to FIG. 10, the front frame 404 includes a gate actuator 520 that is coupled at a first end thereof to the lower portion 462 of the front frame 404. The gate actuator also includes a pin 522 located at a second end thereof. The gate actuator 520 is configured to extend and retract to move the pin 522 vertically. When the gate actuator 520 is contracted and the gate 510 is in the closed position, the cutout 514 of the gate 510 is configured to receive the pin 522 of the actuator 520. When the pin 522 is positioned in the cutout 514, the gate actuator 520 is configured to extend to move the gate 510 vertically upward (against compression force of the spring 512) to the open position. It should be appreciated that the gate actuator 520 is engaged with the gate 510 only when the supply line 406 is engaged with the outlet 424 of the front tank 412. As shown in FIG. 15, the gate actuator 520 may be included in the control system 600. For example, the gate actuator 520 is operative coupled to the controller 602 and configured to receive signals from the controller 602 causing the gate actuator 520 to extend or retract. For example, the controller 602 may receive signals from the user interface 608, and the controller 602 may cause the gate actuator 520 to extend or retract in response to the signals received from the user interface 608.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. An agricultural machine for distributing commodity to soil, comprising:
   a tractor having a front end, a rear end, and a front frame movably coupled to the front end;
   a main tank configured to store commodity;
   an implement coupled to the rear end of the tractor, the implement including row units configured to distribute commodity received from the main tank to the soil;
   a front tank configured to be supported above the ground by the front frame; and
   a supply line configured to transfer additional commodity from the front tank to the main tank as commodity from the main tank is distributed to the soil via the row units,
   wherein the front frame includes an upper portion and a lower portion;
   wherein one of the upper portion and the front tank includes a hook, and the other of the upper portion and the front tank includes a bracket configured to receive the hook; and wherein, when the hook is engaged with the bracket, the hook is configured to rotate relative to the bracket to engage the supply line with the front tank.

2. The agricultural system of claim 1, wherein the supply line includes an outlet coupled to the main tank and an inlet that is fixed to the front frame for movement therewith relative to the front end of the tractor.

3. The agricultural machine of claim 1, further comprising:

a first actuation assembly including a first actuator configured to extend and retract to move the front frame relative to the front end of the tractor; and a second actuation assembly separate from the first actuation assembly and including a second actuator configured to extend and retract to move the front frame relative to the front end of the tractor.

4. The agricultural machine of claim 3, wherein the first actuator of the first actuation assembly is configured to extend to move the front frame downward relative to the front end of the tractor and configured to retract to move the front frame upward relative to the front end of the tractor.

5. The agricultural machine of claim 4, wherein the second actuator of the second actuation assembly is configured to extend to move an upper portion of the front frame away from the front end of the tractor and configured to retract to move the upper portion of the front frame toward the front end of the tractor.

6. The agricultural machine of claim 3, wherein the first actuation assembly is pivotably coupled to the front end of the tractor and pivotably coupled to the lower portion of front frame.

7. The agricultural machine of claim 6, wherein the second actuation assembly is pivotably coupled to the front end of the tractor and pivotably coupled to the upper portion of the front frame.

8. The agricultural machine of claim 6, wherein the first actuation assembly includes a base that is pivotably coupled to the front end of the tractor; and wherein the first actuator of the first actuation assembly is pivotably coupled to the base and to the front end of the tractor.

9. The agricultural machine of claim 1, further comprising:

a gate movable relative to an outlet of the front tank between a closed position in which the gate blocks the outlet of the front tank and an open position in which the gate does not block the outlet of the front tank.

10. The agricultural machine of claim 9, further comprising:

a gate actuator fixed to the front frame for movement therewith relative to the front end of the tractor;

wherein the gate actuator is configured to move the gate from the closed position to the open position when engaged with the gate.

11. The agricultural machine of claim 9, further comprising a spring including a first end coupled to the gate for movement therewith and a second end fixed relative to the outlet of the front tank; and wherein the spring is biased to maintain the gate in the closed position.

12. The agricultural machine of claim 1, further comprising:

an airflow device coupled to the supply line and configured to provide airflow to urge commodity from the front tank to the main tank.

13. The agricultural machine of claim 1, further comprising:

a sensor configured to measure at least one of: a volume of commodity in the main tank, a mass of commodity in the main tank, and a flow rate of commodity from the main tank; and a controller operatively coupled to the sensor and configured to control the transfer of commodity from the front tank to the main tank based on at least one measurement from the sensor.

14. The agricultural machine of claim 1, wherein the bracket is v-shaped.

15. An agricultural machine for distributing commodity to soil, comprising:

a tractor having a front end, a rear end, and a front frame movably coupled to the front end, the front frame comprising an upper portion and a lower portion, the upper portion having a first pair of brackets and the lower portion having a second pair of brackets, each bracket of the first and second pair of brackets having outer edges that converge to a middle portion of the bracket;

a main tank configured to store commodity;

a front tank configured to be supported above the ground by the front frame, the front tank having a first pair of cantilevers and a second pair of cantilevers;

an implement coupled to the rear end of the tractor, the implement including row units configured to distribute commodity received from the main tank to the soil; and a supply line configured to transfer additional commodity from the front tank to the main tank as commodity from the main tank is distributed to the soil via the row units;

wherein the supply line includes an outlet coupled to the main tank and an inlet that is fixed to the front frame for movement therewith relative to the front end of the tractor, and wherein the first and second pairs of cantilevers are configured to, in response to a movement of the front frame, self-center to the middle portion of, and rotate relative to, a corresponding bracket of the first and second pairs of brackets to engage the inlet of the supply line with an outlet of the front tank.

16. The agricultural machine of claim 15, further comprising:

a first actuation assembly including a first actuator configured to extend and retract to move the front frame relative to the front end of the tractor; and a second actuation assembly separate from the first actuation assembly and including a second actuator configured to extend and retract to move the front frame relative to the front end of the tractor.

17. The agricultural machine of claim 16, wherein the first actuation assembly is pivotably coupled to the front end of the tractor and pivotably coupled to the lower portion of front frame; and wherein the second actuation assembly is pivotably coupled to the front end of the tractor and pivotably coupled to the upper portion of the front frame.

18. The agricultural machine of claim 15, wherein the first pair of brackets each comprises a vertically oriented channel that receives a post from a corresponding cantilever of the first pair of cantilevers, and the second pair of brackets each comprises a horizontally oriented channel that receives a post from a corresponding cantilever of the second pair of cantilevers.

19. A method for distributing commodity comprising:

engaging a front frame of a tractor with a front tank that has commodity therein;

pivoting the front frame relative to a front end of the tractor to engage a supply line, which is fixed to the front frame, with the front tank;

advancing a first bracket pair on an upper portion of the front frame and a second bracket pair on a lower portion of the front frame toward corresponding first and second cantilever pairs on the front tank such that (1) the first and second cantilever pairs self-center to middle portions of the first and second bracket pairs, respectively, and (2) hooks of the first cantilever pair rotate relative to brackets of the first bracket pair and posts of the second cantilever pair seat at middle portions of the second bracket pair as an inlet of the supply line engages with an outlet of the front tank; and transferring commodity from the front tank to a main tank via the supply line after the supply line is engaged with the front tank.

20. The method of claim 19, wherein pivoting the front frame relative to the front end of the tractor includes:

adjusting a first actuator included in a first actuation assembly that is coupled to a lower portion of the front frame; and adjusting a second actuator included in a second actuation assembly that is coupled to an upper portion of the front frame.

*    *    *    *    *